United States Patent
Kim et al.

(10) Patent No.: US 10,929,085 B2
(45) Date of Patent: Feb. 23, 2021

(54) ELECTRONIC APPARATUS FOR CONTROLLING DISPLAY OF VIRTUAL INPUT INTERFACE IN ENVIRONMENT OF A PLURALITY OF OUTPUT SCREENS AND OPERATING METHOD THEREOF

(71) Applicant: Samsung Electronics Co., Ltd., Suwon-si (KR)

(72) Inventors: Jaeyeob Kim, Suwon-si (KR); Myojin Bang, Suwon-si (KR); Jinyeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/527,741

(22) Filed: Jul. 31, 2019

(65) Prior Publication Data

US 2020/0042268 A1     Feb. 6, 2020

(30) Foreign Application Priority Data

Jul. 31, 2018  (KR) .................. 10-2018-0089340

(51) Int. Cl.
*G06F 3/14*  (2006.01)
*G06F 3/0488*  (2013.01)

(52) U.S. Cl.
CPC ........ *G06F 3/1423* (2013.01); *G06F 3/04886* (2013.01)

(58) Field of Classification Search
CPC .................... G06F 3/1423; G06F 3/04886
See application file for complete search history.

(56) References Cited

U.S. PATENT DOCUMENTS

| | | | |
|---|---|---|---|
| 10,019,583 B2* | 7/2018 | Swidowski | G06F 9/45558 |
| 10,043,487 B2* | 8/2018 | Nguyen | G09G 5/363 |
| 10,067,656 B2* | 9/2018 | Kocharlakota | G06F 3/0482 |
| 10,074,303 B2* | 9/2018 | Ha | G02B 27/017 |
| 10,620,435 B2* | 4/2020 | Thieberger | G06F 3/011 |
| 2006/0087502 A1* | 4/2006 | Karidis | G06F 1/3265 345/211 |
| 2013/0016040 A1 | 1/2013 | Ann et al. | |
| 2014/0136986 A1 | 5/2014 | Martin et al. | |

(Continued)

FOREIGN PATENT DOCUMENTS

WO     2014-038918 A1    3/2014

OTHER PUBLICATIONS

Wikipedia, "State Pattern", https://en.wikipedia.org/wiki/State_pattern, Jun. 28, 2019.

(Continued)

*Primary Examiner* — Sejoon Ahn
(74) *Attorney, Agent, or Firm* — Jefferson IP Law, LLP

(57) ABSTRACT

An electronic device and an operating method of the electronic device are provided. The method includes determining a display scheme of a virtual input interface as a first display scheme, based on context information of the electronic device, in response to a change of context of the electronic device detected while the virtual input interface is displayed based on the first display scheme, changing the display scheme of the virtual input interface from the first display scheme to a second display scheme which is different from the first display scheme, and displaying the virtual input interface based on the second display scheme.

20 Claims, 19 Drawing Sheets

(56) References Cited

U.S. PATENT DOCUMENTS

2014/0267074 A1   9/2014  Balci et al.
2016/0239250 A1   8/2016  Kim et al.
2016/0313964 A1  10/2016  De Paz et al.

OTHER PUBLICATIONS

International Search Report dated Nov. 21, 2019, issued in International Patent Application No. PCT/KR2019/009511.

* cited by examiner

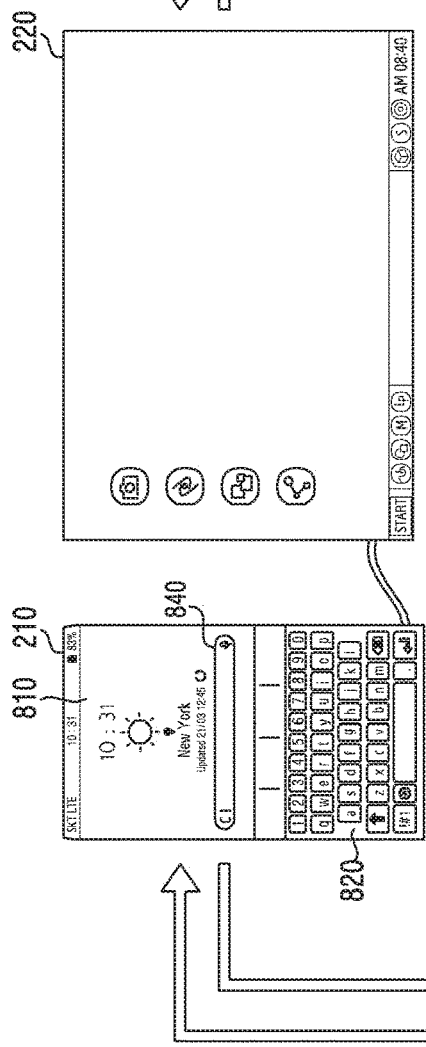
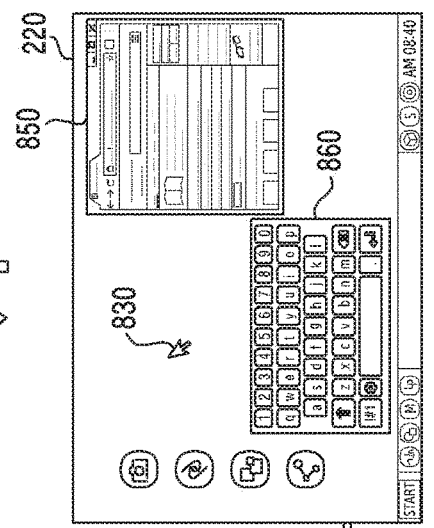
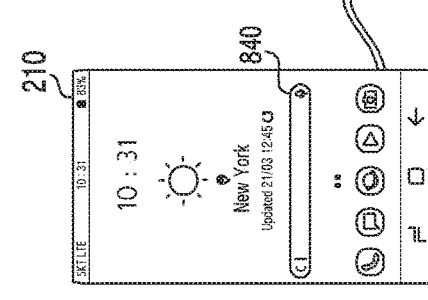
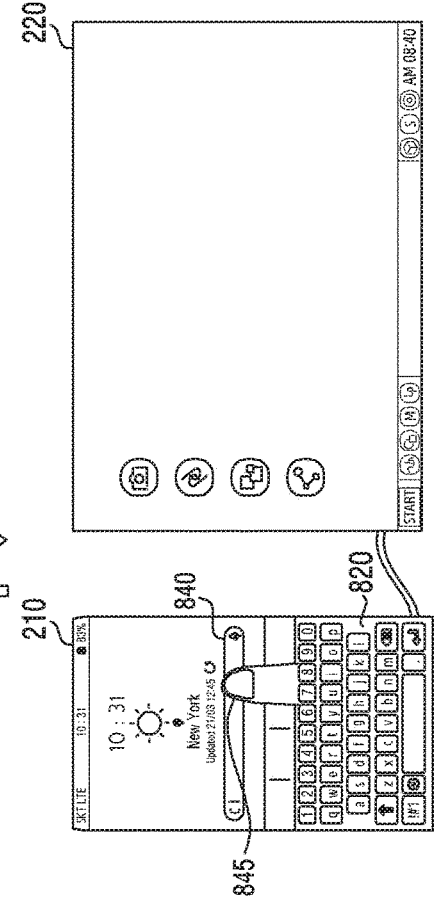
FIG.11A
FIG.11B
FIG.11C

ELECTRONIC APPARATUS FOR CONTROLLING DISPLAY OF VIRTUAL INPUT INTERFACE IN ENVIRONMENT OF A PLURALITY OF OUTPUT SCREENS AND OPERATING METHOD THEREOF

CROSS-REFERENCE TO RELATED APPLICATION(S)

This application is based on and claims priority under 35 U.S.C. § 119(a) of a Korean patent application number 10-2018-0089340, filed on Jul. 31, 2018, in the Korean Intellectual Property Office, the disclosure of which is incorporated by reference herein in its entirety.

BACKGROUND

1. Field

The disclosure relates to an electronic device and its operating method for controlling display and operating of a virtual input interface such as a soft keyboard, in an environment of a plurality of output screens which output an execution screen of one electronic device on the plurality of the output screens.

2. Description of Related Art

A portable electronic device such as a smartphone exhibits higher performance to smoothly carry out more complicated functions or services such as game, messenger, document editing, image/video playback and editing, which were mostly conducted at a personal computer (PC), in addition to basic services such as phone call and messaging. Hence, the functions mostly performed at the PC are often carried out at the portable electronic device.

However, tasks requiring a wider screen, such as document writing, high-quality video playback, and document editing requiring several references may, if executed at the portable electronic device, still cause inconvenience to a user.

To mitigate such inconvenience, techniques for improving the user's convenience by outputting the screen of the portable electronic device similarly to a PC environment by use of an output device of an external device connected to the portable electronic device are suggested.

According to such techniques, at least one of the output screens including the output screen of the electronic device and the output screen of the external device may display a virtual input interface (e.g., a virtual keyboard) for receiving a user's input. Such a virtual input interface may be displayed based on an application running on the electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for controlling display and operating of a virtual input interface such as a soft keyboard, in an environment of a plurality of output screens which output an execution screen of one electronic device on the plurality of the output screens.

Additional aspects will be set forth in part in the description which follows and, in part, will be apparent from the description, or may be learned by practice of the presented embodiments.

If a virtual input interface is displayed in an environment of a plurality of output screens including an output screen of an electronic device and an output screen of an external device, various situations or scenarios may develop according to a position of an input focus (e.g., a mouse cursor), and a number of the output screens which display content. To cover such various situations, the related art should install respective applications. That is, if the situation of the electronic device changes, an application corresponding to a particular output of the virtual input interface may not change the output of the virtual input interface in response to the changed situation of the electronic device.

As a result, if the virtual input interface is displayed in the environment of the plurality of the output screens, one application package (APK) for changing the output of the virtual input interface is required, in response to detecting an event which requires changing the output of the displayed virtual input interface.

In accordance with an aspect of the disclosure, an electronic device is provided. The electronic device includes a first display, a communication interface, and a processor electrically coupled with the first display and the communication interface. The processor is configured to, while a first external device including a second display is connected, determine a display scheme of a virtual input interface as a first display scheme, based on context information of the electronic device, in response to a change of context of the electronic device detected while the virtual input interface is displayed based on the first display scheme, change the display scheme of the virtual input interface from the first display scheme to a second display scheme which is different from the first display scheme, and control at least one of the first display or the first external device to display the virtual input interface based on the second display scheme.

In accordance with another aspect of the disclosure, an operating method of an electronic device, including a first display, and which is connected to a first external device including a second display, is provided. The method includes determining a display scheme of a virtual input interface as a first display scheme, based on context information of the electronic device, in response to a change of context of the electronic device detected while the virtual input interface is displayed based on the first display scheme, changing the display scheme of the virtual input interface from the first display scheme to a second display scheme which is different from the first display scheme, and displaying the virtual input interface based on the second display scheme.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11A illustrates changing an output screen according to a change of a setting value associated with a virtual input interface in a dual mode according to an embodiment of the disclosure;

FIG. 11B illustrates changing the output screen according to the change of the setting value associated with the virtual input interface in the dual mode according to an embodiment of the disclosure;

FIG. 11C illustrates changing the output screen according to the change of the setting value associated with the virtual input interface in the dual mode according to an embodiment of the disclosure;

Throughout the drawings, like reference numerals will be understood to refer to like parts, components and structures.

DETAILED DESCRIPTION

Figure 1:
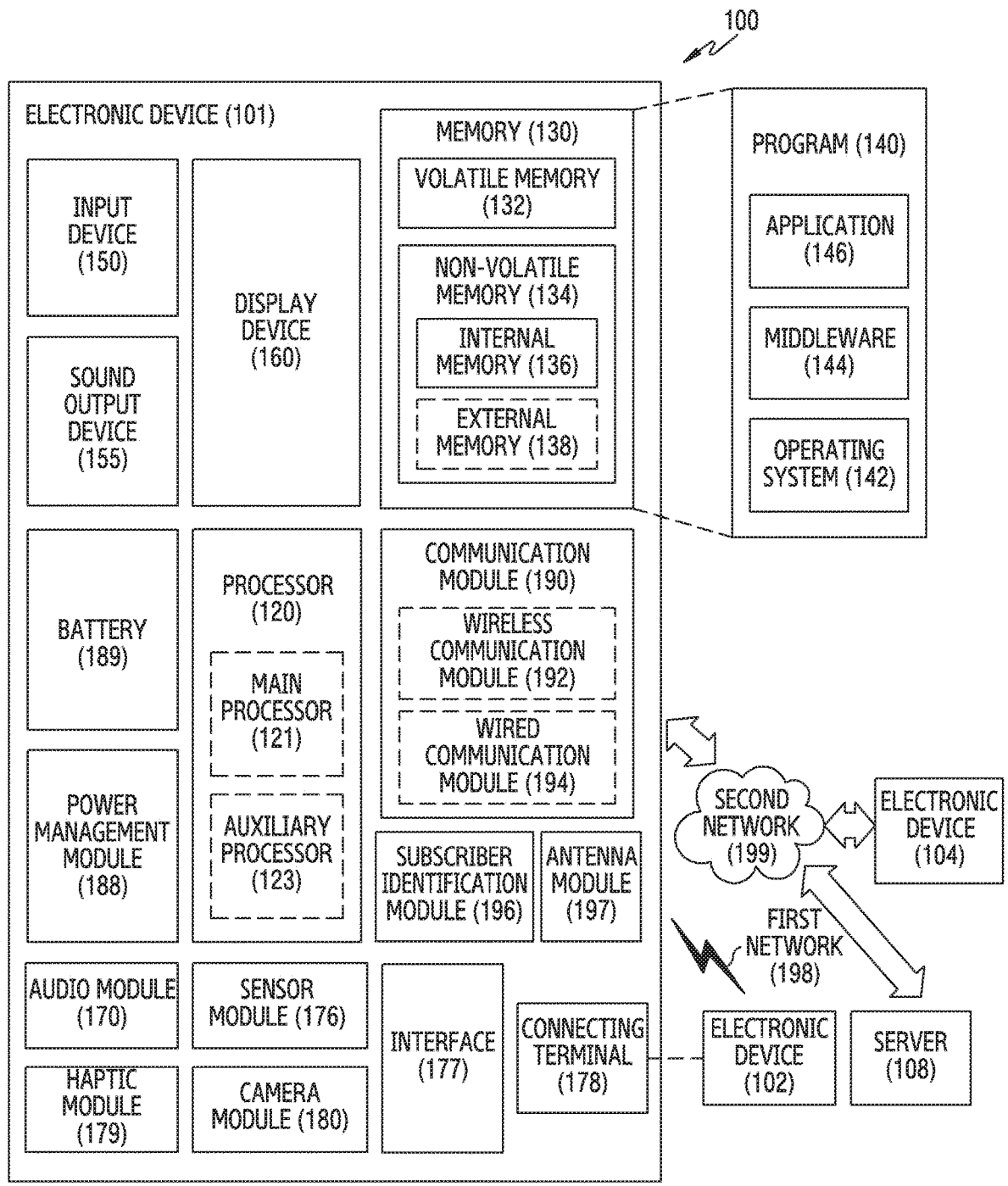
FIG. 1 illustrates an environment of a network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to an embodiment of the disclosure.

Referring to FIG. 1, the electronic device 101 in the network environment 100 communicates with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
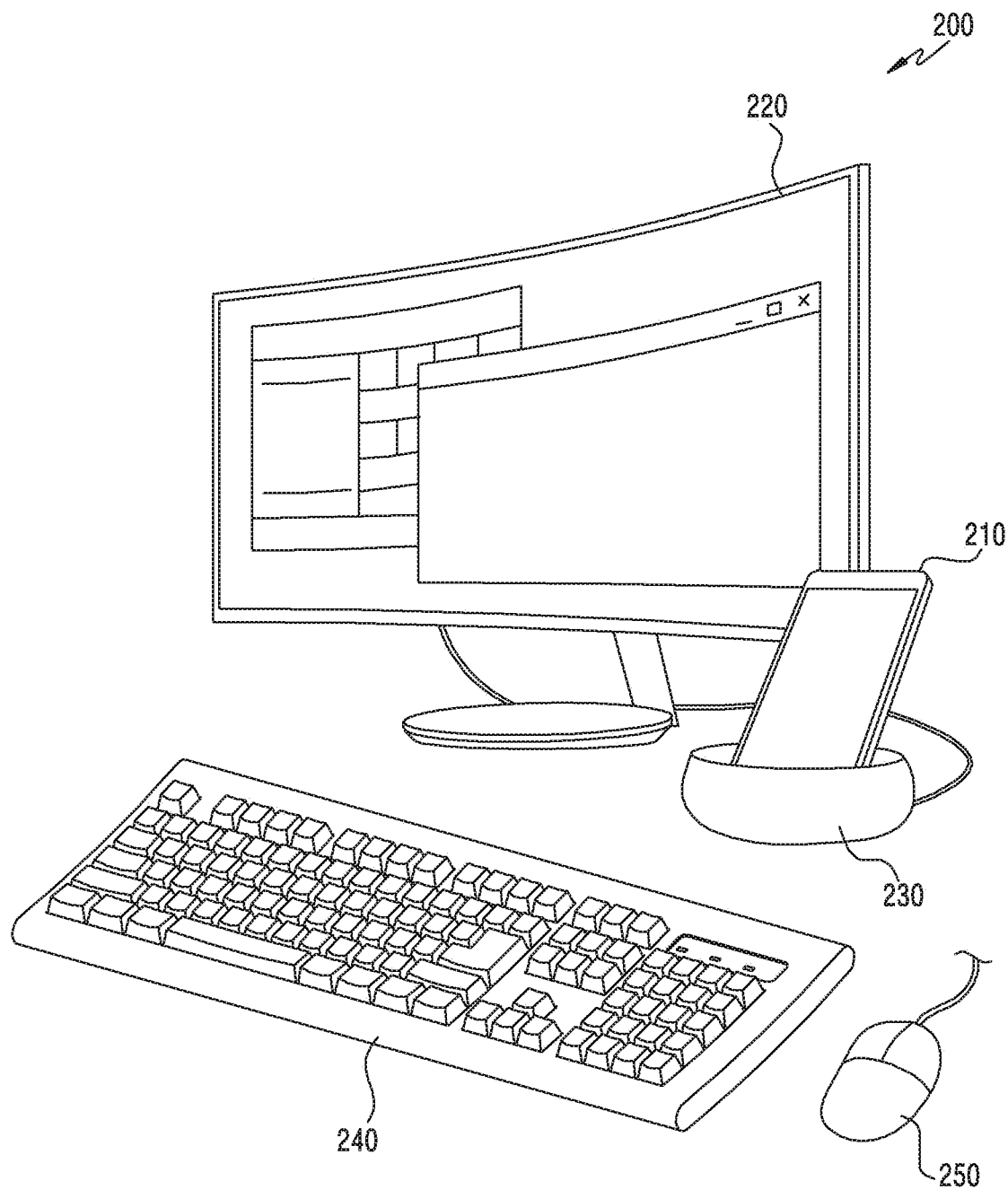
FIG. 2 illustrates an operating environment of an electronic device according to an embodiment of the disclosure.

FIG. 2 illustrates an operating environment of an electronic device according to an embodiment of the disclosure.

Referring to FIG. 2, an electronic device 210 in the operating environment 200 according to an embodiment of the disclosure may be connected to a mediation device 230 and an external output device 220. The electronic device 210 may be a mobile device, for example, a smartphone, a tablet personal computer (PC) or a wearable device (e.g., a smart watch). The electronic device 210 may include a display (e.g., the display device 160 of FIG. 1). Notably, a size of the electronic device 210 may be limited for the sake of its portability, and accordingly a size of the display of the electronic device 210 may be also limited.

The electronic device 210 may be connected to the external output device 220 via the mediation device 230. The mediation device 230 may be, for example, a dock or a docking station. The electronic device 210 may be placed on the mediation device 230. The electronic device 210 may be connected to the mediation device 230 by wire through, for example, an input/output interface such as a universal serial bus (USB) port. For example, the electronic device 210 may be wirelessly connected to the mediation device 230 using short range wireless communication such as Bluetooth. The mediation device 230 may mediate the connection between the electronic device 210 and the external output device 220. While the electronic device 210 is connected indirectly with the external output device 220 via, but not limited to, the mediation device 230, the electronic device 210 may be connected to the mediation device 230 directly (i.e., without the mediation device 230) through the cable or the wireless connection.

If the electronic device 210 is connected to the external output device 220, the electronic device 210 may output a screen through the external output device 220. The electronic device 210 may reconstruct the screen displayed on its display, and output (or display) the reconstructed screen through the external output device 220. For example, the electronic device 210 may transmit information of the reconstructed screen to the external output device 220, to output the reconstructed screen at the external output device 220. In this case, the electronic device 210 may provide a user with a user interface (UI) or a user experience (UX) similar to using a desktop or a PC by means of the external output device 220.

If the electronic device 210 is connected to the external output device 220, the electronic device 210 may output (or display) a virtual input interface such as a virtual keyboard on at least one of the electronic device 210 or the external output device 220. Based on at least one of device information of the external output device 220 connected, device information of the electronic device 210, a setting value or an input focus (e.g., a mouse cursor) position, or a user input, the electronic device 210 may determine a state pattern of the virtual input interface associated with display characteristics or a display scheme (e.g., the device for displaying the virtual input interface, the number of the devices for displaying the virtual input interface, a display type of the displayed virtual input interface, a display position. etc.) of the virtual input interface, and display the virtual input interface based on the determined state pattern. The state pattern of the virtual input interface may be defined dually, that is, a first state pattern and a second state pattern may be defined. The first state pattern may be determined based on the device information of the external output device 220 and/or the device information of the electronic device 210, and the second state pattern may be determined based on the setting value or the input focus position. The first state pattern may correspond to a display mode of the virtual input interface, and the second state pattern may correspond to a specific operation scheme of the virtual input interface. That is, the electronic device 210 may obtain its current context information (e.g., the device information of the connected external output device 220, the setting value or the input focus position information), and configure (or display) the virtual input interface in an appropriate form for the current context of the electronic device 210.

If a change of the context of the electronic device 210 or a change of the state pattern caused by the context change is detected, the electronic device 210 may reconfigure the virtual input interface in an appropriate form for the changed context or the changed state pattern. While displaying the virtual input interface based on the first state pattern and the second state pattern, if a change in at least one of the first state pattern and the second state pattern is detected, the electronic device 210 may change the display of the virtual input interface based on the changed state pattern information. That is, the electronic device 210 may dynamically control (or change) the display of the virtual input interface according to the context change of the electronic device 210, in the output environment including the plurality of the output screens.

The electronic device 210 may be connected to an external input device such as a keyboard 240 or a mouse 250, by wire or wirelessly. The electronic device 210 may receive a user input through the keyboard 240 or the mouse 250. The user may control the electronic device 210 by use of the keyboard 240 or the mouse 250. The display of the electronic device 210 may be a touchscreen display, and the electronic device 210 may receive a user input through the touchscreen display.

Figure 3:
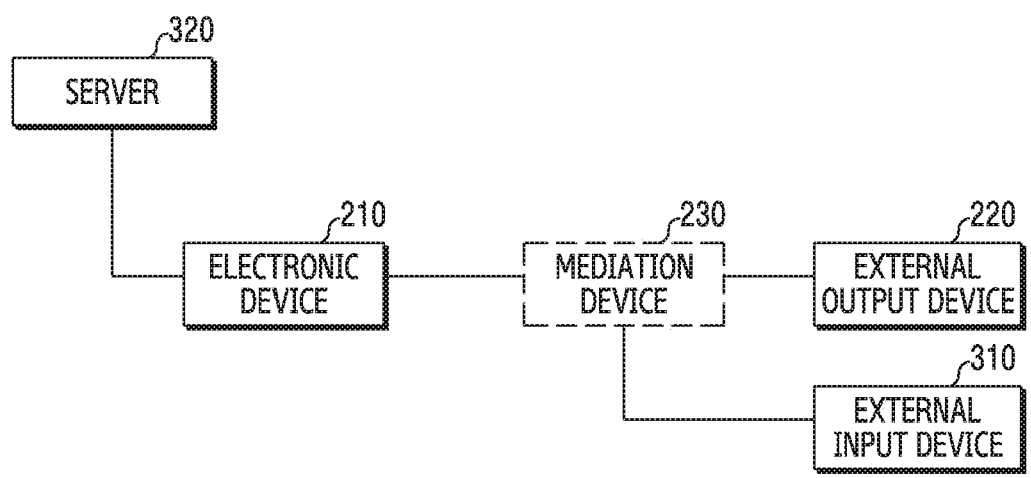
FIG. 3 illustrates connections between an electronic device and external devices according to an embodiment of the disclosure.

FIG. 3 illustrates connections between an electronic device and external devices according to an embodiment of the disclosure.

Referring to FIG. 3, the electronic device 210 according to an embodiment may communicate with at least one of the external output device 220, the mediation device 230, an external input device 310, or a server 320.

The electronic device 210 may be a mobile device such as a smartphone, a tablet PC or a wearable device, for providing the user with the UI and/or the UX similar to the desktop by use of the external output device 220. The electronic device 210 may be connected to the external output device 220 via the mediation device 230 such as a dock. The electronic device 210 may be connected to the external output device 220 by cable (e.g., an HDMI cable) or wirelessly. For example, the electronic device 210 may be connected to the mediation device 230 using a USB cable, and the mediation device 230 may be connected to the external output device 220 using an HDMI cable.

If the external output device 220 is connected to the electronic device 210, the external output device 220 may output (or display) a screen processed (or rendered) by the electronic device 210. The external output device 220 may be one of various devices, for example, monitors or televisions (TVs), including the display. The external output device 220 may be connected to the electronic device 210 via the mediation device 230, or may be connected directly to the electronic device 210.

If the electronic device 210 is connected to the external output device 220, the electronic device 210 may provide the external output device 220 with the UI or the UX similar to using the desktop or the PC. Using the touchscreen display of the electronic device 210, the virtual input interface displayed at the electronic device 210 and/or the external output device 220, or the external input device 310, the user may control the UI or the UX displayed at the external output device 220 (or interact with the UI or the UX displayed at the external output device 220).

The external input device 310 may forward a user input to the electronic device 210. For example, the external input device 310 may employ one of various devices for receiving a user input, such as the keyboard 240, the mouse 250, a trackball, a track pad, and a joystick. The external input device 310 may be connected indirectly to the electronic device 210 via the mediation device 230, or may be connected directly to the electronic device 210. If the external input device 310 is connected to the electronic device 210, the electronic device 210 may control the UI or the UX displayed at the external output device 220 in response to an input for the external input device 310. For example, the electronic device 210 may provide a virtual keyboard to the external output device 220, in response to an input to a left button of the mouse 250.

The server 320 may wirelessly communicate with the electronic device 210. The server 320 may store a list (e.g., a whitelist) of applications which support rendering of an application executing screen, among applications installed on the electronic device 210. In particular, the server 320 may store the list of the applications which support functionality for rendering the application execution screen from the mobile environment to the desktop environment if the electronic device 210 is connected to the external output device 220, and outputting the rendered screen at the external output device 220. If the electronic device 210 is connected to the external output device 220, the server 320 may store a list (e.g., a blacklist) of applications not supporting the above-stated functionality. The list stored in the server 320 may be updated on a periodic basis or if an event occurs. The server 320 may transmit a list of applications installed on the electronic device 210, in the list stored in the server 320, to the electronic device 210.

Figure 4:
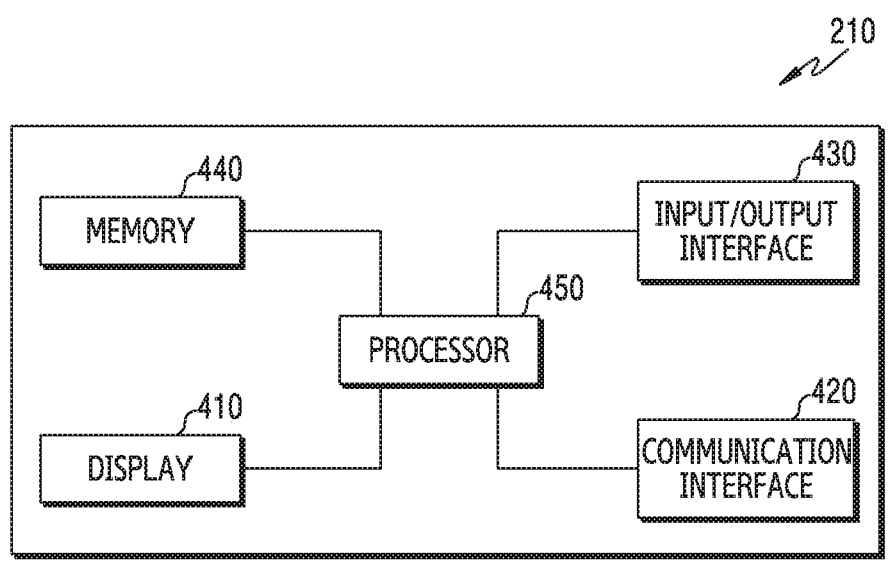
FIG. 4 illustrates a hardware configuration of an electronic device according to an embodiment of the disclosure.

FIG. 4 illustrates a hardware configuration of an electronic device according to an embodiment of the disclosure.

Referring to FIG. 4, the electronic device 210 according to an embodiment may include a display 410, a communication interface 420, an input/output interface 430, a memory 440, and a processor 450.

The display 410 may output a screen. For example, the display 410 may output an execution screen of at least one application running on the electronic device 210. The application execution screen output from the display 410 may be optimized for the mobile environment. The display 410 may be a touchscreen display, and may detect a user's touch input. For example, the display 410 may include a touch panel for detecting the touch input and a display panel for outputting the screen.

If the electronic device 210 is connected to the external output device 220, the display 410 may or may not display the screen. Even if the electronic device 210 is connected to the external output device 220, the display 410 may detect the touch input. For example, if the electronic device 210 is connected to the external output device 220, the display 410 may serve merely as a touch input means or a touch input device for receiving the touch input, without outputting the screen (e.g., a black screen).

The communication interface 420 may be an interface for interconnecting the electronic device 210 and an external device using the wired or wireless communication. In an embodiment, the external device may be at least one of the mediation device 230, the external output device 220, or the server 320. For example, using the communication interface 420, the electronic device 210 may transmit, to the external output device 220, information of the application execution screen rendered into the desktop or PC environment.

The input/output interface 430 may be an interface for interconnecting the electronic device 210 and the external device. In an embodiment, the external device may be at least one of the mediation device 230, the external output device 220, or the server 320. The input/output interface 430 may employ one of various interfaces such as USB, HDMI, D-subminiature (D-SUB), or optical interface.

The memory 440 may include a volatile memory and/or a nonvolatile memory. For example, the memory 440 may store one or more applications or programs. For example, the memory 440 may store a program for generating an execution screen of a particular application for different environments (e.g., the mobile environment, the desktop or PC environment). For example, the memory 440 may include a first launcher for the mobile environment (or the display 410) and a second launcher for the desktop or PC environment (or the external output device 220). The memory 440 may store an operating system of the electronic device 210, and store a framework of the operating system. Program modules stored in the memory 440 shall be elucidated in regard to FIG. 5.

The processor 450 may be electrically or operatively coupled with the display 410, the communication interface 420, the input/output interface 430, and the memory 440. The processor 450 may control the display 410, the communication interface 420, the input/output interface 430, and the memory 440.

According to an embodiment, while the electronic device 210 is disconnected from the external output device 220, the processor 450 may execute the first launcher for the mobile environment (or the display 410). The first launcher may be the program for generating or rendering the particular application execution screen for the mobile environment. The processor 450 may control the display 410 to display an appropriate execution screen (or the execution screen of the first launcher) for the mobile environment of the particular application. In an embodiment, while the display 410 displays the execution screen for the mobile environment of the particular application, the processor 450 may display a virtual input interface. In response to detecting a user input for displaying the virtual input interface, the processor 450 may determine a state pattern of the virtual input interface and display the virtual input interface based on the determined state pattern. The processor 450 may determine a display device, a display type, and a display position of the virtual input interface to be displayed based on the determined state pattern. For example, if a user input which touches a search window of a webpage displayed on the display 410 is detected, the processor 450 may display a virtual keyboard of a normal type or a floating type on at least part of the display 410.

According to an embodiment, the processor 450 may recognize that the electronic device 210 is connected to the external output device 220. The processor 450 may recognize the connection of the external output device 220, through a cable connected to the input/output interface 430. Even if the mediation device 230 connected to the external output device 220 is connected, the processor 450 may recognize that the electronic device 210 is connected with the external output device 220.

According to an embodiment, if the electronic device 210 is connected with the external output device 220, the second launcher for the desktop or PC environment (or the external output device 220) may be executed. The second launcher may be the program for generating or rendering the particular application execution screen for the desktop (or the PC) environment. The processor 450 may transmit relevant data to the external output device 220, to display the appropriate execution screen (or the execution screen of the second launcher) for the desktop environment of the particular application at the external output device 220. In an embodiment, while the external output device 220 displays the execution screen for the desktop environment of the particular application, the processor 450 may display a virtual input interface at the electronic device 210 or the external output device 220. The processor 450 may determine the state pattern of the virtual input interface in response to identifying current context of the electronic device 210, and display the virtual input interface based on the determined state pattern. For example, if the user input which touches the search window of the webpage displayed at the external output device 220 is detected, the processor 450 may display the virtual keyboard of the floating type at the external output device 220. For example, in response to recognizing the connection of the external output device 220, the processor 450 may display the virtual keyboard of the floating type at the external output device 220.

According to an embodiment, if a change of the context of the electronic device 210 is detected, the processor 450 may reconfigure the virtual input interface in an appropriate form for the changed context or change the display scheme of the virtual input interface. In specific, if a change of the first state pattern or the second state pattern according to the context change is detected, the processor 450 may change the display scheme of the virtual input interface based on the changed state pattern information.

In an embodiment, the context change may be at least one of disconnection of the external device (hereafter, referred to as a first external device) from the electronic device 210, connection of a second external device which is different from the first external device, movement of the input focus, the change of the first state pattern of the virtual input interface, or a change of the setting value associated with the virtual input interface. For example, the processor 450 may detect a new connection of a keyboard (e.g., the keyboard 240). For example, the processor 450 may detect a user input which moves the input focus from the external output device 220 to the display 410. For example, the processor 450 may detect a user input for switching the display mode of the virtual input interface from a first display mode to a second display mode.

In an embodiment, the display scheme of the virtual input interface may be related to at least one of the display for displaying the virtual input interface, the number of the devices for displaying the virtual input interface, the display type of the displayed virtual input interface, and the display position.

For example, while the virtual keyboard of the normal type is displayed on part of the display 410 and the external output device 220 does not display the virtual keyboard, in response to a user input which changes the setting value associate with the display of the virtual input interface, the processor 450 may control the display 410 not to display the virtual keyboard and control the external output device 220 to display the virtual keyboard of the floating type on at least part of the screen of the external output device 220.

An electronic device according to various embodiments of the disclosure may include a first display, a communication interface, and a processor electrically coupled with the first display and the communication interface, and the processor may be configured to, while a first external device including a second display is connected, determine a display scheme of a virtual input interface as a first display scheme, based on context information of the electronic device, in response to a change of context of the electronic device detected while the virtual input interface is displayed based on the first display scheme, change the display scheme of the virtual input interface from the first display scheme to a second display scheme which is different from the first display scheme, and control at least one of the first display or the first external device to display the virtual input interface based on the second display scheme.

In various embodiments, the virtual input interface may be a virtual soft keyboard.

In various embodiments, the change of the context of the electronic device may be at least one of disconnection from the first external device, a connection of a second external device, a change of a setting value, a movement of an input focus, or a change of version information of a current platform.

In various embodiments, the display scheme of the virtual input interface may define at least one of a device for displaying the virtual input interface, a number of devices for displaying the virtual input interface, a display type of the virtual input interface, or a display position of the virtual input interface.

In various embodiments, the display scheme of the virtual input interface may be determined based on a first state pattern associated with a display mode and a second state pattern associated with an operating scheme.

In various embodiments, the display type of the virtual input interface may be one of a normal type, a floating type, or a split type.

In various embodiments, the display mode may include a dual view mode, and the dual view mode may be a mode which, according to a setting value, displays the virtual input interface of a first display type on the first display and displays no virtual input interface on the second display, or displays the virtual input interface of a second display type on the second display and displays no virtual input interface on the first display.

In various embodiments, the display mode may include a dual mode, and the dual mode may be a mode which, according to a setting value, displays the virtual input interface of a first display type on the first display and displays no virtual input interface on the second display, or displays the virtual input interface of a designated display type on a display on which an input focus is placed and displays no virtual input interface on the remaining display.

In various embodiments, the display mode may include a standalone mode, and the standalone may be a mode which displays at least one application execution screen corresponding to a desktop environment or a virtual input interface of a floating type on the first display.

In various embodiments, the processor may be configured to, using an application installed on the electronic device, change the display scheme of the virtual input interface from the first display scheme to a second display scheme which is different from the first display scheme, and the application may be installed on the electronic device based on an install file version.

Figure 5:
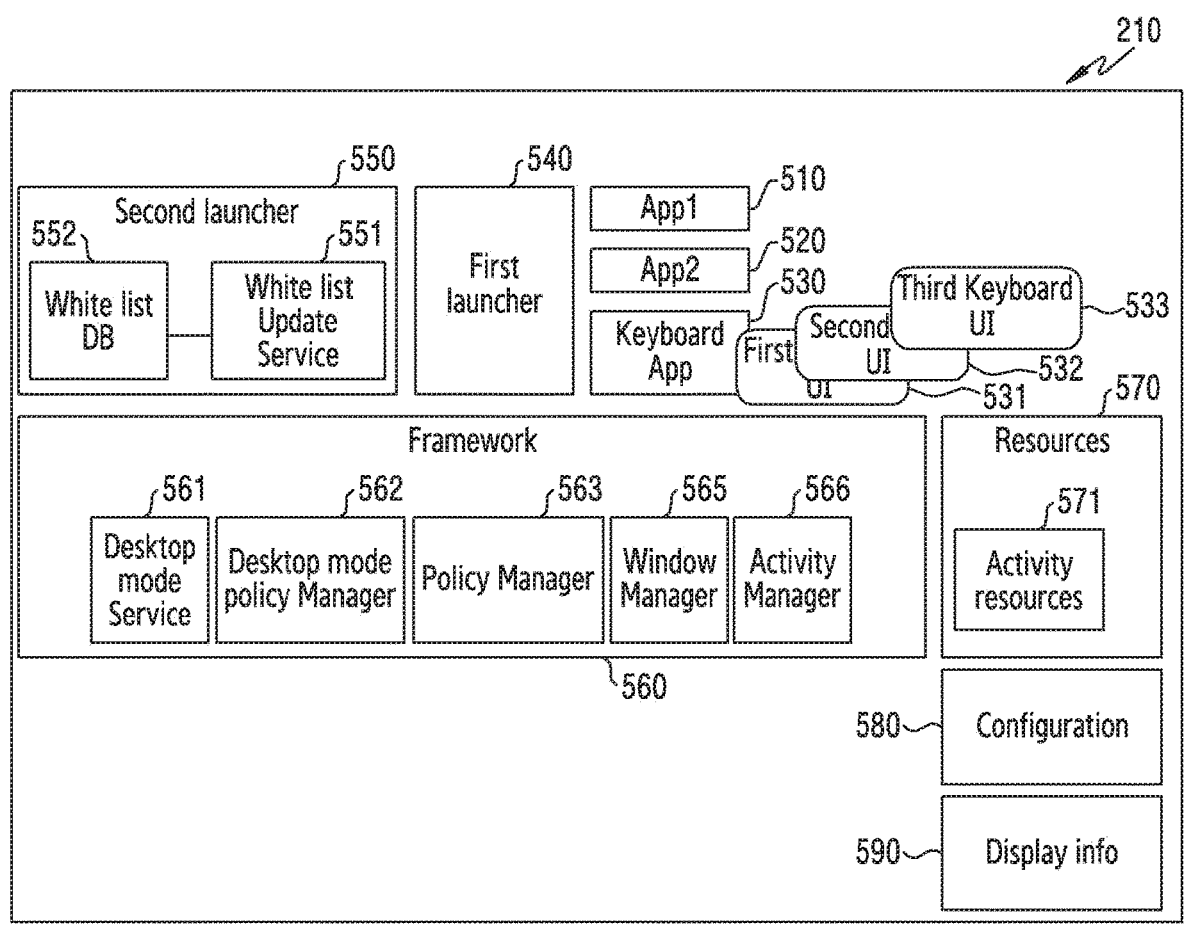
FIG. 5 illustrates a software structure of an electronic device according to an embodiment of the disclosure.

FIG. 5 illustrates a software structure of an electronic device according to an embodiment of the disclosure.

Referring to FIG. 5, the electronic device 210 according to an embodiment may store a first application 510, a second application 520, a third application 530, a first launcher 540, a second launcher 550, a framework 560, resources 570, a configuration 580, and display info 590. The program modules of FIG. 5 may be stored in the memory 440 of FIG. 4, and executed by the processor 450 of FIG. 4.

The electronic device 210 may store the applications 510, 520, and 530. While the electronic device 210 stores, but not limited to, the three applications 510, 520, and 530 in FIG. 5, the electronic device 210 may store any number of applications.

The application 530 may be an application for controlling a virtual input interface. The application 530 may be installed on the electronic device 210 based on an install file version. The application 530 may store information of a plurality of virtual input interfaces 531, 532, and 533. For example, the information of the first virtual input interface 531, the second virtual input interface 532, and the third virtual input interface 533 each may include information regarding how the virtual input interface (e.g., the virtual keyboard) is displayed on each device. The information of the first virtual input interface 531, the second virtual input interface 532, and the third virtual input interface 533 may correspond to the first state pattern of a designated value and the second state pattern of a designated value. For example, the first virtual input interface 531 may correspond to the first state pattern determined to be 'Dual' and the second state pattern determined to be 'Phonestate'. For example, the second virtual input interface 532 may correspond to the first state pattern determined to be 'DualView' and the second state pattern determined to be 'DesktopState'. In an embodiment, the first state pattern may be determined based on the device information of the electronic device 210 and/or the external output device 220, and the second state pattern may be determined based on the context of the electronic device 210 (or the change of the context). Hence, using an application 530 installed on the electronic device 210, the electronic device 210 may display the virtual input interface suitable for various scenarios which may occur in the environment of the multiple output screens.

The first launcher 540 may be executed if the electronic device 210 is not connected with the external output device 220. The first launcher 540 may provide the UI and the UX such as a home screen, displayed on the touchscreen display.

The second launcher 550 may be executed if the electronic device 210 is connected with the external output device 220. If the electronic device 210 is connected with the external output device 220, the second launcher 550 may provide introduction of the desktop mode, and provide a desktop mode execution or mirroring connection option. The second launcher 550 may provide the UI or the UX similar to the desktop displayed at the external output device 220. The second launcher 550 may include a whitelist update service 551 and a whitelist database (DB) 552.

The framework 560 may include a desktop mode service 561, a desktop mode policy manager 562, a policy manager 563, a window manager 565, and an activity manager 566.

The desktop mode service 561 may, if an application is executed, obtain information associated with resizing of the executed application.

The desktop mode policy manager 562 may receive the information obtained by the desktop mode service 561.

The desktop mode policy manager 562 may forward a determination result to the desktop mode service 561, and the desktop mode service 561 may provide a service based on the received result.

The window manager 565 may change the configuration 580. The window manager 565 may generate a window based on the changed configuration 580.

If the configuration is changed, the activity manager 566 may obtain the changed configuration 580 from the window manager 565.

The resources 570 may include activity resources 571 of the application. The activity resources 571 may include, for example, information of an image and a layout in an execution screen of the activity modified based on the configuration 580.

The configuration 580 may include information of a pixel density (e.g., dots per inch (dpi)) of the screen generated by the electronic device 210, an orientation (e.g., a landscape orientation or a portrait orientation), a full screen size, and an application execution screen size. The configuration 580 may correspond to each activity included in the application.

The display info 590 may include information of a physical size (e.g., a width and height) of the display.

Figure 6A:
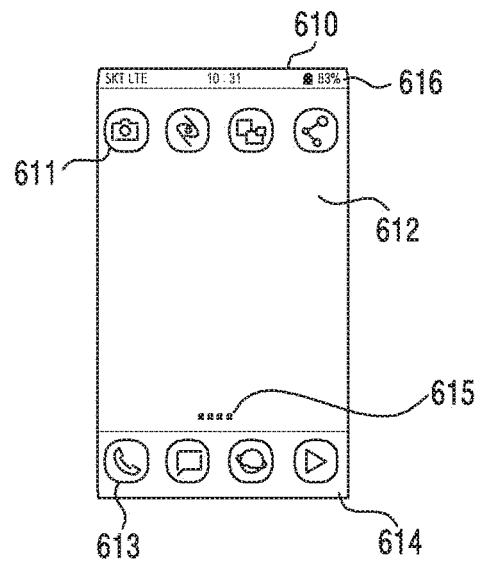
FIG. 6A illustrates output screens corresponding to a mobile environment and a personal computer (PC) environment respectively according to an embodiment of the disclosure.
Figure 6B:
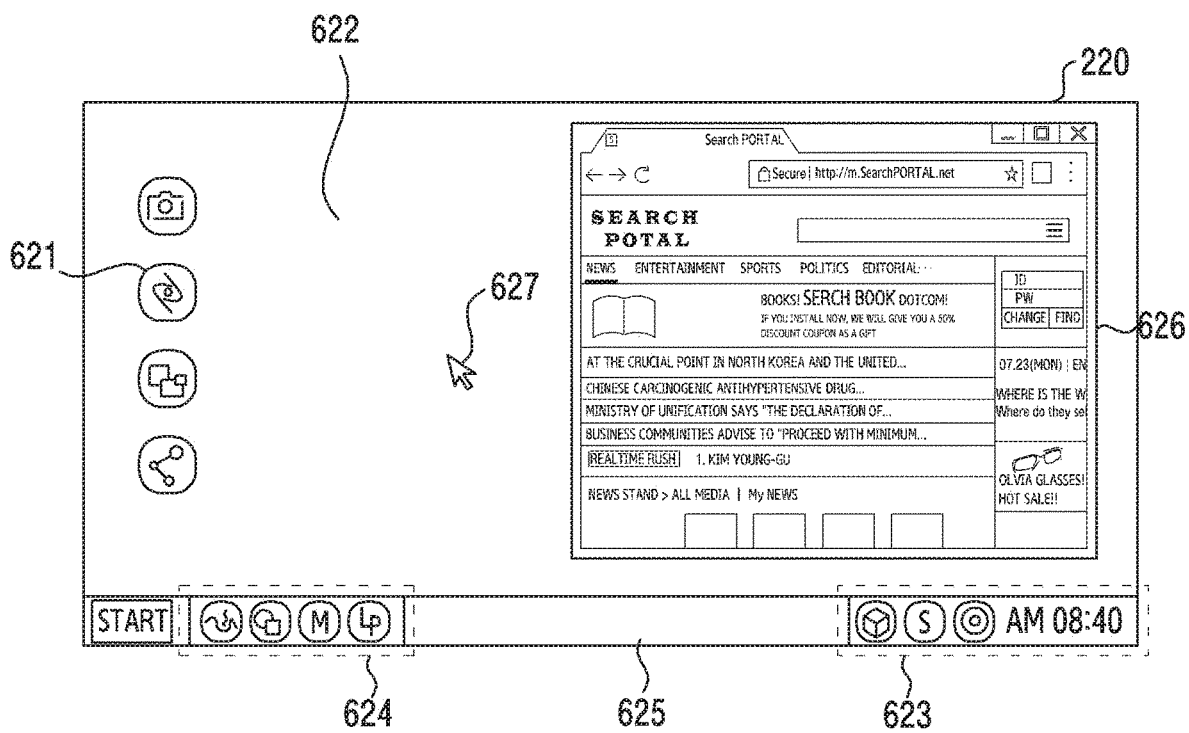
FIG. 6B illustrates output screens corresponding to the mobile environment and the PC environment respectively according to an embodiment of the disclosure.

FIGS. 6A and 6B illustrate output screens corresponding to a mobile environment and a PC environment respectively according to various embodiments of the disclosure.

Referring to FIG. 6A, an execution screen of a home screen application which is generated or rendered for the mobile environment is depicted. The execution screen 610 of the home screen application of FIG. 6A may be displayed on the display 410 of the electronic device 210.

In an embodiment, the application execution screen 610 rendered for the mobile environment may display an icon display area 612, an essential icon display area 614, and a display bar 616. The icon display area 612 may display at least one application execution icon 611. The essential icon display area 614 may display at least one essential application execution icon 613. The display bar 616 may display information such as a communication provider, a current time, and a remaining battery level. The icon display area 612 may correspond to at least one page, and the displayed page may switch from a current page to a previous or next page in response to a user's page swipe input (e.g., a page scroll input). An indicator 615 indicating the current page may be displayed at the bottom of the icon display area 612.

Although not depicted, a virtual input interface may be displayed on at least part of the display 410. For example, the virtual keyboard of the normal type may be displayed in at least part of at least one of the icon display area 612 or the essential icon display area 614.

Referring to FIG. 6B, the execution screen of the home screen application which is generated or rendered for the desktop environment is depicted. The execution screen of the home screen application of FIG. 6B may be displayed at the external output device 220.

In an embodiment, the home screen application execution screen generated or rendered for the desktop environment may display an icon display area 622 and a tray area 625, identically or similarly to a background screen of a normal desktop.

The icon display area 622 may display at least one icon 621. Unlike the icon display area 612, the icon display area 622 may display not only a program execution icon but also a file icon corresponding to content such as an image, a video, and a text.

The tray area 625 may include a quick execute area 624 and a function icon area 623. Although not depicted, the tray area 625 may include a search window. The quick execute area 624 may display at least one shortcut icon for quickly executing an application, and the function icon area 623 may display at least one shortcut icon for performing a specific function such as volume control, Bluetooth connection, and Wi-Fi activation.

An input focus 627 may be displayed in at least part of at least one of the icon display area 622 or the tray area 625. The input focus 627 may indicate an indicator which moves on the screen in response to a user's input. For example, the input focus 627 may indicate a cursor of the mouse 250. The user may move the input focus 627 by using the mouse 250 connected to the electronic device 210.

A program execution window 626 may be displayed in at least part of at least one of the icon display area 622 or the tray area 625. The program execution window 626 may display an execution window of a program currently running. For example, the program execution window 626 may display an execution screen of an Internet web browser program.

Although not depicted, at least part of at least one of the icon display area 622 or the tray area 625 may display a virtual input interface. For example, if a user input to a search window (not shown) of the program execution window 626 is detected, a virtual keyboard may be displayed in at least part of the icon display area 622.

Figure 7A:
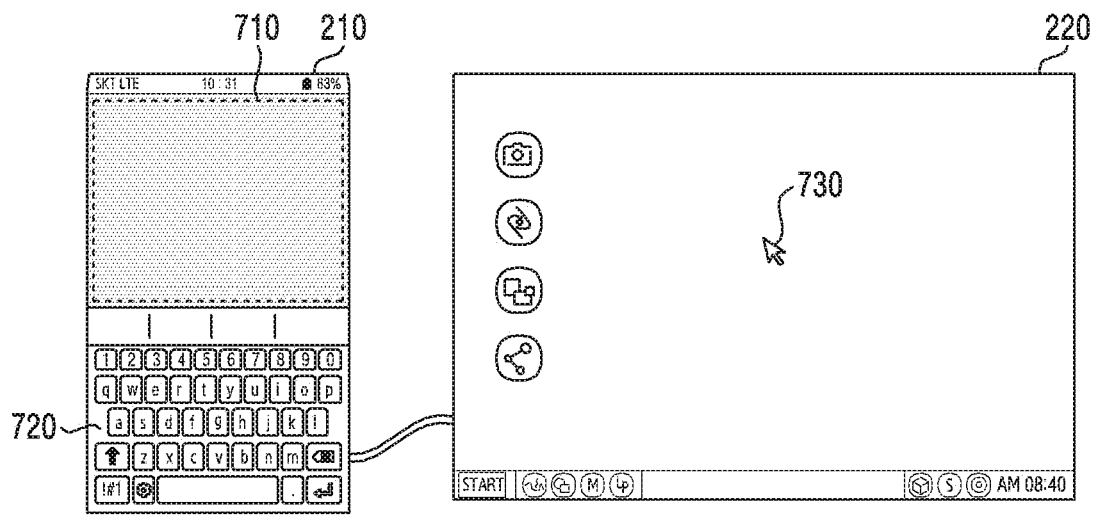
FIG. 7A illustrates an output screen of a dual view mode according to an embodiment of the disclosure.
Figure 7B:
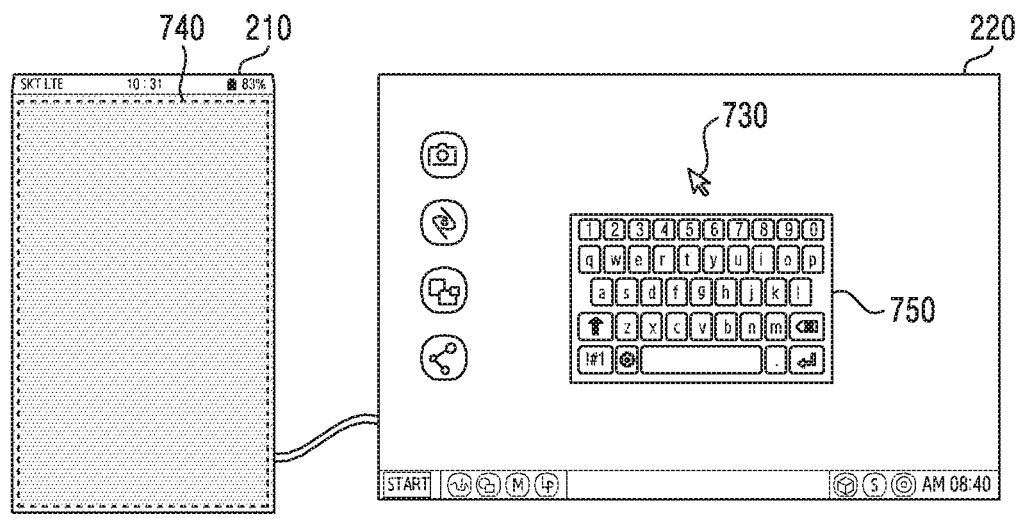
FIG. 7B illustrates the output screen of the dual view mode according to an embodiment of the disclosure.

FIGS. 7A and 7B illustrate an output screen of a dual view mode according to various embodiments of the disclosure.

In an embodiment, the dual view mode is a display mode of the virtual input interface, and may correspond to the first state pattern.

In an embodiment, the dual view mode may output the virtual input interface at any one of the display 410 and the external output device 220, according to the setting value of the virtual input interface. For example, if a value touch_keyboard is currently set to on, at least part of the display 410 may display a virtual keyboard 720 of the normal type and the external output device 220 may not display the virtual keyboard. If the value touch_keyboard is currently set to off, at least part of the display 410 may display no virtual keyboard 720 and at least some area of the external output device 220 may display the virtual keyboard 750 of the floating type.

In an embodiment, the display type of the virtual input interface may adopt one of a normal type, a floating type, or a split type. The normal type may securely display the virtual input interface in one area without mobility. The floating type may change the display position of the virtual input interface according to a user input (e.g., drag). The split type may display the virtual input interface by dividing it into at least two.

The processor 450 may determine the display type of the virtual input interface, depending on the device which displays the virtual input interface. For example, if the virtual input interface is displayed on the display 410, the processor 450 may determine the display type to be the normal type. If the virtual input interface is displayed at the external output device 220, the processor 450 may determine the display type to be the floating type.

In an embodiment, the processor 450 may control the display 410 to use at least part of the display 410 as a touch pad area in the dual view mode. The touch pad area may allow the user to control the input focus (e.g., the mouse point, the mouse cursor) by dragging the touch pad area with a finger, with the mouse 250 disconnected. For example, the processor 450 may detect the connection of the external output device 220, in response to detecting that the value touch_keyboard is set to on, display the keyboard of the normal type on at least part of the display 410, and display the touch pad area 710 in the remaining area of the display 410. For example, the processor 450 may detect the connection of the external output device 220, and perform the above-stated operation in response to detecting that the value touch_keyboard is set to on and the mouse 250 is not connected. For example, the processor 450 may detect the connection of the external output device 220, and in response to detecting that the value touch_keyboard is set to off, display a touch pad area 740 on the entire area of the display 410. For example, the processor 450 may detect the connection of the external output device 220, and in response to detecting that the value touch_keyboard is set to off and the mouse 250 is not connected, display the touch pad area 740 on the entire area of the display 410.

In an embodiment, the processor 450 may display the input focus 730, in at least some area of the external output device 220.

Figure 8A:
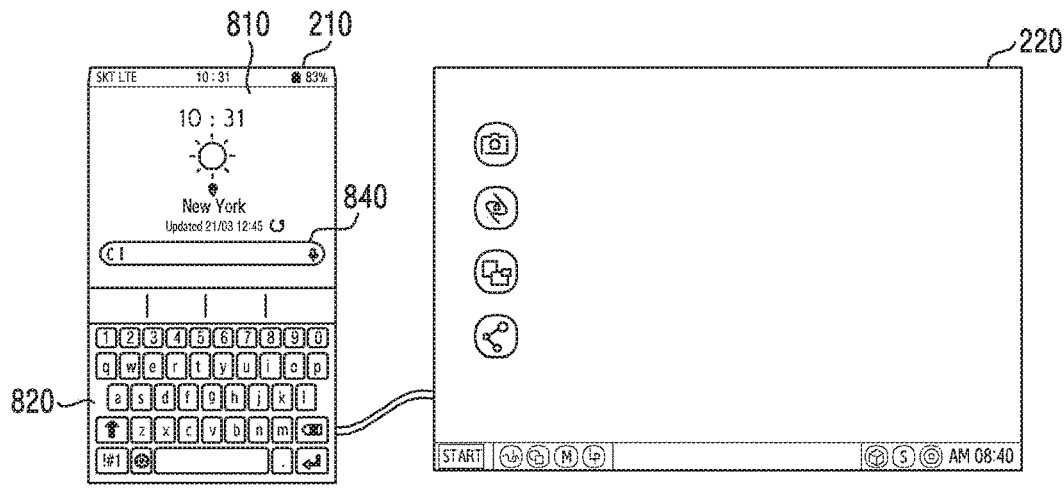
FIG. 8A illustrates an output screen of a dual mode according to an embodiment of the disclosure.
Figure 8B:
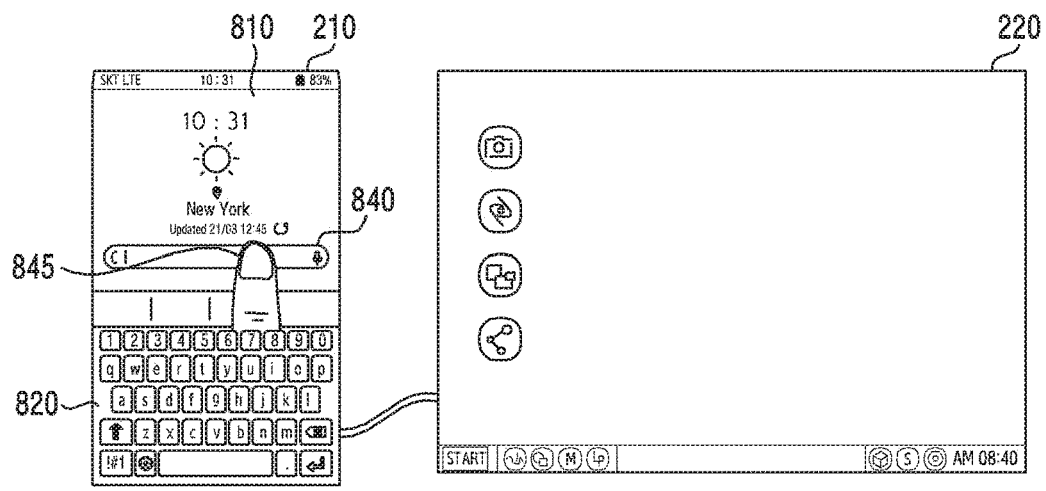
FIG. 8B illustrates the output screen of the dual mode according to an embodiment of the disclosure.
Figure 8C:
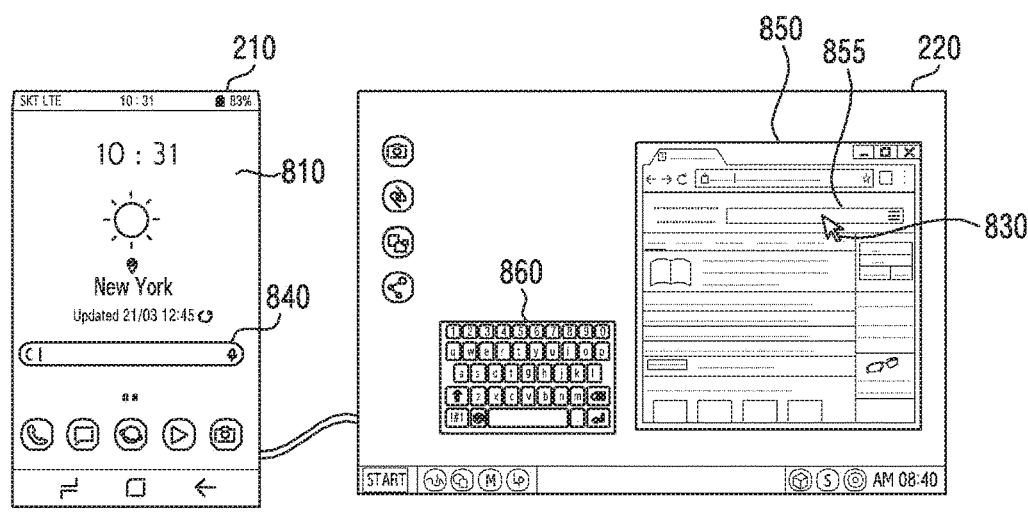
FIG. 8C illustrates the output screen of the dual mode according to an embodiment of the disclosure.

FIGS. 8A, 8B, and 8C illustrate an output screen of a dual mode according to various embodiments of the disclosure.

In an embodiment, the dual mode is a kind of the display mode of the virtual input interface, and may correspond to the first state pattern.

In an embodiment, the dual mode may provide a screen of a corresponding environment to the display 410 and the external output device 220, and differently display the virtual input interface according to a current position of the input focus 830 (e.g., a mouse cursor). For example, in the dual mode, a screen for the mobile environment may be provided to the display 410, a screen for the desktop environment may be provided to the external output device 220, and the virtual input interface may be displayed based on the current position of the input focus 830.

Referring to FIG. 8B, at least some area of the display 410 may display an application execution screen 810 based on the mobile environment, and a background screen based on the desktop environment may be provided to the external output device 220. If a user input 845 to a search window 840 of the application execution screen 810 is detected, the processor 450 may display the virtual keyboard 820 of the normal type in at least part of the display 410 and the external output device 220 may not display the virtual keyboard. For example, the user input 845 to the search window 840 may be a touch input on the display 410. If the user input 845 to the search window 840 is detected, the external output device 220 may not display the mouse cursor and the input focus 830 may be placed on the display 410.

Figure 10A:
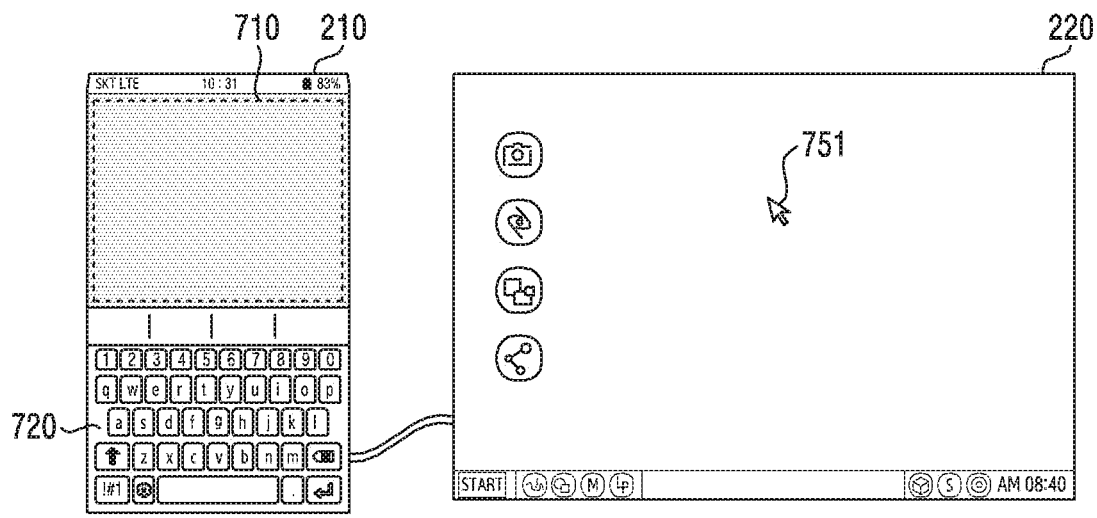
FIG. 10A illustrates changing an output screen according to a change of a setting value associated with a virtual input interface in a dual view mode according to an embodiment of the disclosure.
Figure 10B:
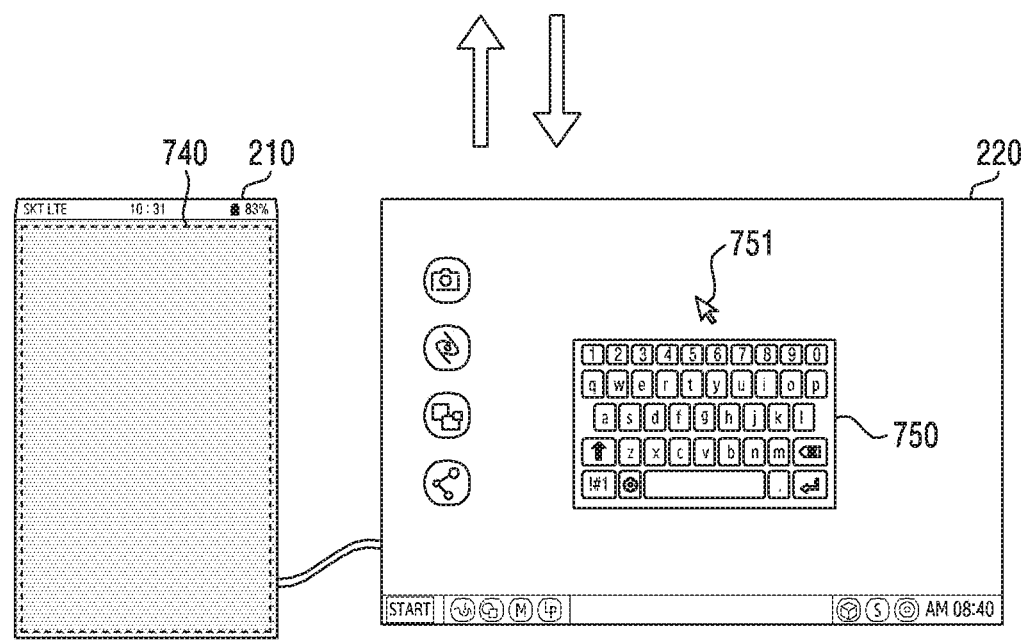
FIG. 10B illustrates changing the output screen according to the change of the setting value associated with the virtual input interface in the dual view mode according to an embodiment of the disclosure.

Referring to FIG. 8C, at least part of the display 410 may display the application execution screen 810 based on the mobile environment as in FIG. 10B-1, and the external output device 220 may display at least one application execution screen 850 corresponding to the desktop environment. If a user input (e.g., mouse click) to a search window 855 of the application execution screen 850 is detected, the processor 450 may display no virtual keyboard on the display 410 and display a virtual keyboard 860 of the floating type at the external output device 220.

In an embodiment, similarly to the dual view mode of FIG. 7, the dual mode may perform a different operation according to the setting value of the virtual input interface. For example, if the value touch_keyboard is set to off, the operations described in FIG. 10B-1 and FIG. 10B-2 may be performed. For example, if the value touch_keyboard is set to on, the operations described in FIG. 8A may be performed.

Referring to FIG. 8A, if the value touch_keyboard is set to on, the virtual input interface may be displayed only on the display 410, regardless of the position of the input focus 830. For example, some region of the display 410 may display the virtual keyboard 820 of the normal type. The processor 450 may detect a user input to the search window (or various user interfaces requiring the output of the virtual keyboard) displayed in some region of the display 410 or some region of the external output device 220, and display the virtual keyboard 820 of the normal type in some region of the display 410, in response to identifying that the value touch_keyboard is set to on.

Figure 9:
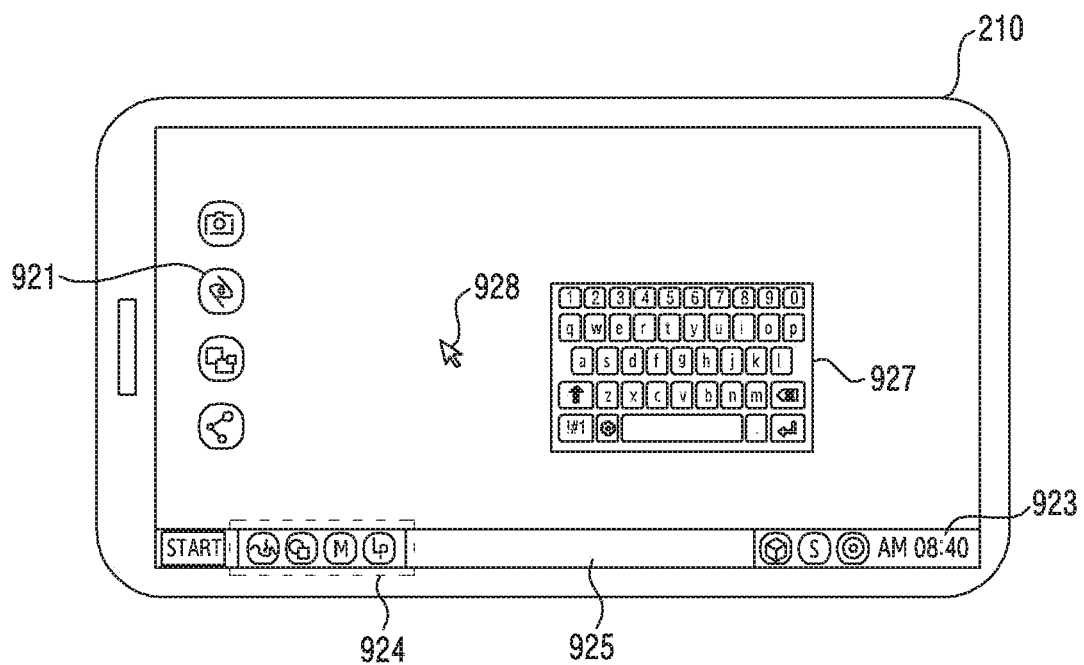
FIG. 9 illustrates an output screen of a standalone mode according to an embodiment of the disclosure.

FIG. 9 illustrates an output screen of a standalone mode according to an embodiment of the disclosure.

In an embodiment, the standalone mode is a kind of the display mode of the virtual input interface, and may correspond to the first state pattern.

In an embodiment, the standalone mode may, if the external output device 220 is not connected, display at least one application execution screen corresponding to the desktop environment on the display 410.

In an embodiment, it is advantageous that the standalone mode is executed at the electronic device 210 having a relatively great size of the display 410, for example, but not limited to, at a tablet PC, but the standalone mode may also be executed if the electronic device 210 is a smart phone.

Referring to FIG. 9, in the standalone mode, the display 410 of the electronic device 210 may display an icon display area for displaying at least one icon 921, and a tray area 925 including a quick execution area 924 and a function icon area 923. The display 410 may display a virtual input interface of a designated display type in at least some area of at least one of the icon display area or the tray area 925. The display 410 may display an input focus 928 (e.g., a mouse cursor). The display 410 may display the virtual input interface of the floating type by default, and may display the virtual input interface of the normal or split type according to a user's option change.

In an embodiment, if a context change of the electronic device 210 is detected, the processor 450 may reconfigure the virtual input interface to be appropriate to the changed context. If the context change is detected while displaying the virtual input interface in a different mode from the standalone mode, the processor 450 may display the virtual input interface in the standalone mode. For example, if a user input for entering the standalone mode (or for switching to the desktop environment) is detected while displaying the application execution screen corresponding to the mobile environment and the virtual keyboard of the normal type, the processor 450 may display the application execution screen corresponding to the desktop environment and the virtual keyboard of the floating type. For example, if displaying the virtual input interface in one of the dual view mode or the dual mode, in response to detecting the disconnection of the external output device 220, the processor 450 may newly display the virtual input interface based on the standalone mode. The processor 450 may inquire (e.g., via a popup interface) of the user whether to display the virtual input interface in the standalone mode, or may inquire about a user's intended mode, and may display the virtual input interface in the standalone mode without inquiring of the user.

In FIG. 7 through FIG. 9, the various modes of the virtual input interface corresponding to the first state pattern have been described. Embodiments for changing the display of the virtual input interface for the modes in response to the change of the second state pattern caused by the context change are described below.

FIGS. 10A and 10B illustrate changing an output screen according to a change of a setting value associated with a virtual input interface in a dual view mode according to various embodiments of the disclosure.

Referring to FIG. 10A, the processor 450 may detect the connection of the external output device 220, and determine the first state pattern. The processor 450 may determine the first state pattern based on the device information of the external output device 220 and/or the device information of the electronic device 210. In response to identifying that the setting value (e.g., the setting value touch_keyboard) of the display of the virtual input interface is set to on, the processor 450 may determine the second state pattern, and display the virtual input interface based on the determined first state pattern and/or second state pattern. For example, the processor 450 may determine the first state pattern to be DualView (i.e., corresponding to the dual view mode), and determine the second state pattern to be PhoneState (i.e., the second state pattern for processing the virtual input interface of the normal type displayed at the electronic device 210). The processor 450 may display the virtual input interface in a similar manner to the embodiment disclosed in FIG. 7A. For example, the processor 450 may display a virtual keyboard 920 of the normal type on at least part of the display 410, and control the external output device 220 not to display the virtual keyboard.

If a change of the context of the electronic device 210 is detected, the processor 450 may reconfigure the virtual input interface in an appropriate form for the changed context. For example, in response to detecting a user input which changes (e.g., on to off) the setting value of the display of the virtual input interface, the processor 450 may change the second state pattern (e.g., PhoneState to DesktopState) and change the display of the virtual input interface based on the changed second state pattern. The second state pattern corresponding to DesktopState may process the display state of the virtual input interface of the floating type at the first external device. The processor 450 may display the virtual input interface similarly to the embodiment disclosed in FIG. 7B.

Referring to FIG. 10B, the processor 450 may control the display 410 not to display the virtual keyboard, and control the external output device 220 to display the virtual keyboard 750 of the floating type in at least some area of the external output device 220. The processor 450 may control the display 410 to use the entire area of the display 410 as the touch pad area 740. Although not illustrated in detail, in response to detecting a user input which changes (e.g., off to on) the setting value of the display of the virtual input interface, the processor 450 may also change the display of the virtual input interface.

In an embodiment, while the setting value of the display of the virtual input interface is changed, the input focus (e.g., a mouse cursor 751) may be placed at the external output device 220.

FIGS. 11A, 11B, and 11C illustrate changing an output screen according to a change of a setting value of a virtual input interface in a dual mode according to various embodiments of the disclosure.

Referring to FIG. 11A, the processor 450 may detect the connection of the external output device 220, and determine the first state pattern. In response to identifying that the setting value (e.g., the setting value touch_keyboard) of the display of the virtual input interface is set to 'on', the processor 450 may determine the second state pattern, and display the virtual input interface based on the determined first state pattern and/or the second state pattern. For example, the processor 450 may determine the first state pattern to be Dual (corresponding to the dual mode), and determine the second state pattern to be PhoneState. The processor 450 may display the virtual input interface in a similar manner to the embodiment disclosed in FIG. 8A. For example, the processor 450 may display a virtual keyboard 820 of the normal type on at least part of the display 410, and may not display the virtual keyboard at the external output device 220.

In response to detecting a user input which changes (e.g., on to off) the setting value of the display of the virtual input interface, the processor 450 may change the second state pattern (e.g., PhoneState to DesktopState) and change the display of the virtual input interface based on the changed second state pattern. The processor 450 may display the virtual input interface similarly to the embodiment disclosed in FIG. 10B. For example, the processor 450 may identify a current position of the input focus 830 (e.g., a mouse cursor), and display the virtual input interface based on the identified current position of the input focus. Specifically, if the input focus is placed on the display 410 (e.g., if a user's input 845 is detected in the search window 840 on the display 410), the processor 450 may maintain the display of a virtual keyboard 1020 of the normal type on at least part of the display 410 (see FIG. 13B-1). If the input focus 830 (e.g., a mouse cursor) is placed at the external output device 220, the processor 450 may control the display 410 not to display the virtual keyboard, and control the external output device 220 to display the virtual keyboard 860 of the floating type in at least some area of the external output device 220.

Figure 12A:
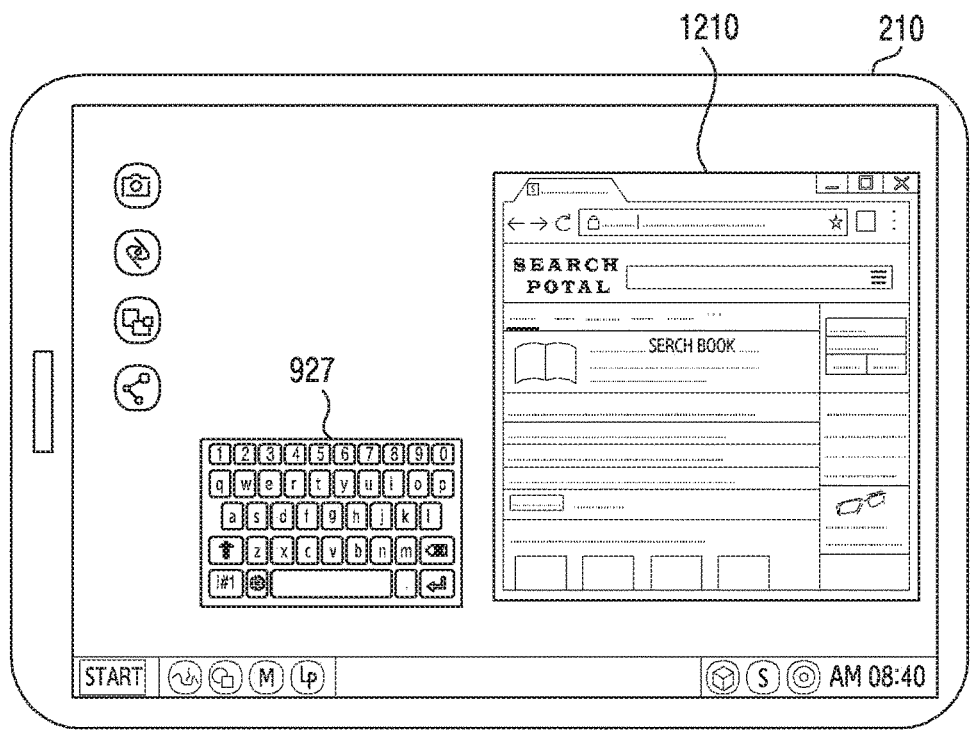
FIG. 12A illustrates changing an output screen according to entering or releasing a mode in a standalone mode according to an embodiment of the disclosure.
Figure 12B:
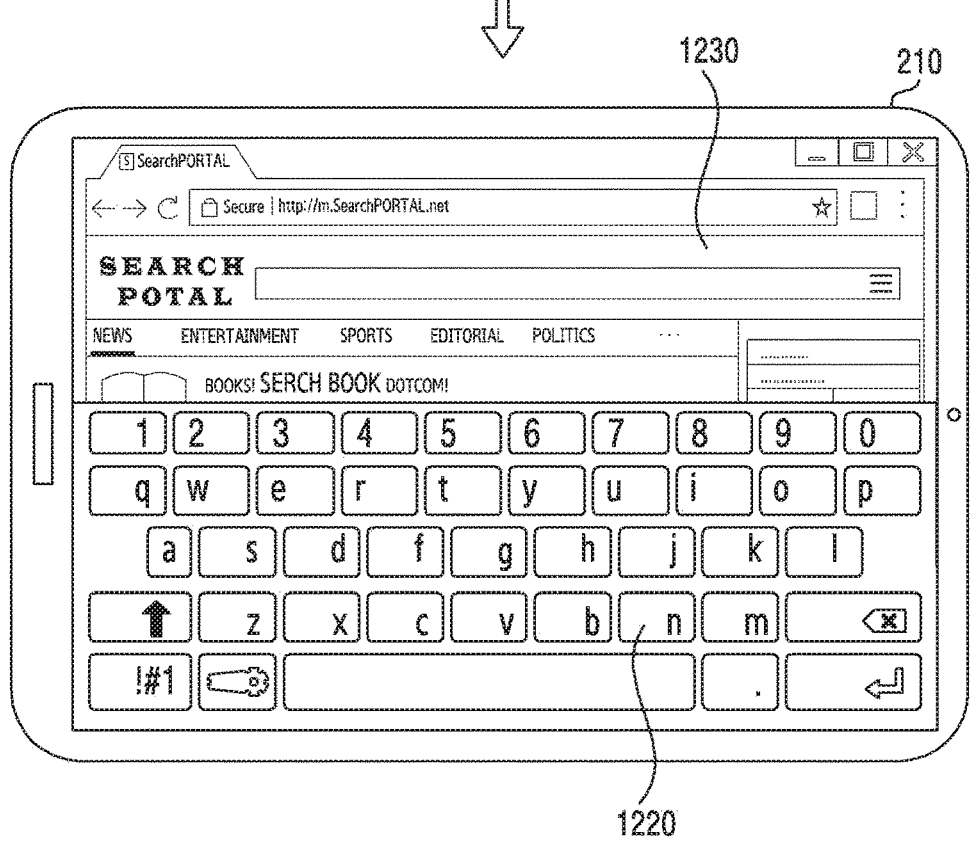
FIG. 12B illustrates changing the output screen according to entering or releasing the mode in the standalone mode according to an embodiment of the disclosure.

FIGS. 12A and 12B illustrate changing an output screen according to entering or releasing a mode in a standalone mode according to various embodiments of the disclosure.

In an embodiment, a specific mode of the virtual input interface may be the standalone mode.

FIG. 12A illustrates the virtual input interface displayed in the standalone mode, and FIG. 12B illustrates the virtual input interface displayed if the standalone mode is released. In FIG. 12A, the first state pattern may be determined to be StandAlone, and the second state pattern may be determined to be StandAloneDesktopState. In FIG. 12B, the first state pattern may be determined to be StandAlone, and the second state pattern may be determined to be StandAlonePhoneState.

Referring to FIG. 12A, the processor 450 may display at least one application execution screen 1210 for the desktop environment on the display 410 of the electronic device 210. For example, the processor 450 may execute a home screen application execution screen and the Internet web browser application execution screen 1210. In addition, the processor 450 may display a virtual keyboard 927 of a designated type (e.g., the floating type) on at least part of the display 410.

Referring to FIG. 12B, the processor 450 may display at least one application execution screen 1210 for the mobile environment on the display 410 of the electronic device 210. For example, in response to detecting a user input which releases the standalone mode, the processor 450 may execute an Internet web browser application execution screen 1230 rendered for the mobile environment. In addition, the processor 450 may change the display position and the display type of the virtual keyboard. For example, the processor 450 may control the display 410 to display a virtual keyboard 1220 of the normal type, without displaying the virtual keyboard of the floating type.

Figure 13:
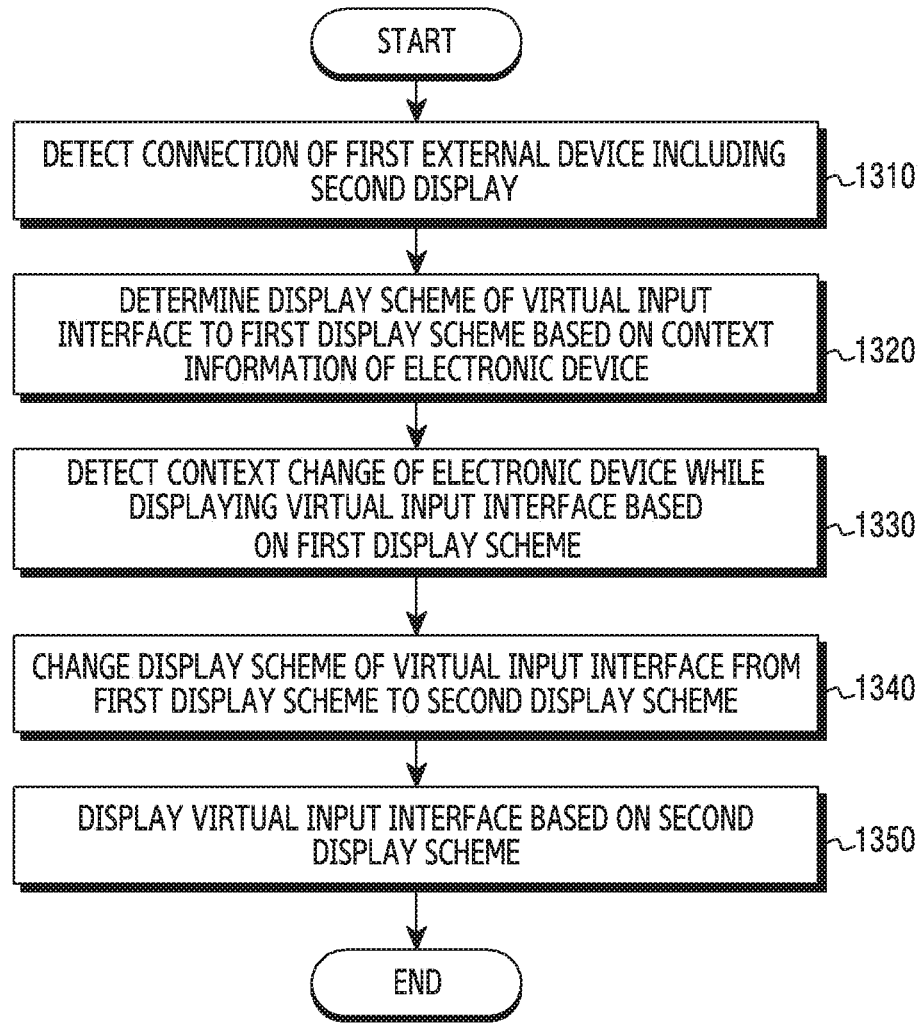
FIG. 13 illustrates a flowchart of operations for changing display of a virtual input interface in an environment of a plurality of output screens including a plurality of output devices according to an embodiment of the disclosure.

FIG. 13 illustrates a flowchart of operations for changing display of a virtual input interface in an environment of a plurality of output screens including a plurality of output devices according to an embodiment of the disclosure.

Referring to FIG. 13, the operations may be performed by the processor 450 of the electronic device 210 including the first display 410.

In operation 1310, the processor 450 may detect the connection of the first external device including the second display. The first external device may be the external output device 220.

In operation 1320, the processor 450 may determine the display scheme of the virtual input interface to be the first display scheme. The display scheme of the virtual input interface may be determined based on the first state pattern and/or the second state pattern. A first display scheme may correspond to the first state pattern of a designated value and/or the second state pattern of a designated value.

In an embodiment, the processor 450 may determine the first state pattern, based on at least one of a type of an application (or an application package) currently running on the electronic device 210, a version of the application (or the application package) currently running, the device information (e.g., hardware/software specifications, etc.) of the electronic device 210, device information of the first external device, or version information of the platform (e.g., the operating system) currently driving. For example, the processor 450 may determine the first state pattern to DualView (corresponding to the dual view mode) based on at least one of the type of the application currently driving in the electronic device 210, the device information of the electronic device 210, and the device information of the first external device.

In an embodiment, the processor 450 may determine the second state pattern, based on at least one of the setting value of the virtual input interface or the position of the input focus (e.g., the mouse cursor). For example, in response to identifying that the setting value of the virtual input interface is set to off, the processor 450 may determine the second state pattern to be DesktopState.

In operation 1330, the processor 450 may detect a change of the context of the electronic device 210. In an embodiment, the processor 450 may detect the change of the context of the electronic device 210, while displaying the virtual input interface based on the first display scheme. In an embodiment, the change of the context may be at least one of a disconnection of the first external device from the electronic device 210, a connection of the second external device which is different from the first external device, a movement of the user's input focus, a change of the current mode of the virtual input interface, or a change of the setting value (e.g., the setting value touch_keyboard) of the display of the virtual input interface. For example, the processor 450 may detect a user input which changes the current mode from the dual mode to the dual view mode (or detect a user input which changes the first state pattern from Dual to DualView). For example, the processor 450 may detect a user input which changes the setting value touch_keyboard from on to off. For example, the processor 450 may detect a user input which moves the input focus from the external output device 220 to the display 410.

In operation 1340, the processor 450 may change the display scheme of the virtual input interface from the first display scheme to the second display scheme. Using the changed context information of the electronic device 210, the processor 450 may newly determine a value for at least one of the first state pattern or the second state pattern, and determine the second display scheme based on the newly determined value.

In operation 1350, the processor 450 may display the virtual input interface based on the second display scheme.

For example, if a user input which changes the current mode from the dual mode to the dual view mode is detected, the processor 450 may identify the setting value touch_keyboard and display the virtual input interface based on the identified setting value. If the setting value touch_keyboard is on, the processor 450 may maintain the display of the virtual keyboard of the normal type on part of the display 410, and newly display the touch pad area on the remaining area of the display 410.

For example, if the user input which changes the setting value touch_keyboard from on to off is detected, the processor 450 may identify the current mode (or identify the first state pattern) and change the display of the virtual input interface according to the identified current mode. If the current mode is the dual view mode, the processor 450 may not further display the virtual keyboard of the normal type on part of the display 410, and may control the display 410 to use the whole area of the display 410 as the touch pad area. In addition, the processor 450 may control the external output device 220 to display the virtual keyboard of the floating type on at least some area of the external output device 220.

For example, if a user input for moving the input focus from the external output device 220 to the display 410 is detected, the processor 450 may determine the second display scheme to display the virtual input interface on the display 410. Specifically, in the dual view mode with the setting value touch_keyboard of off, if the user input for moving the input focus from the external output device 220 to the display 410 is detected, the processor 450 may change the setting value touch_keyboard to on (or change the second state pattern from DesktopState to PhoneState) and display the virtual keyboard of the normal type on part of the display 410.

Figure 14:
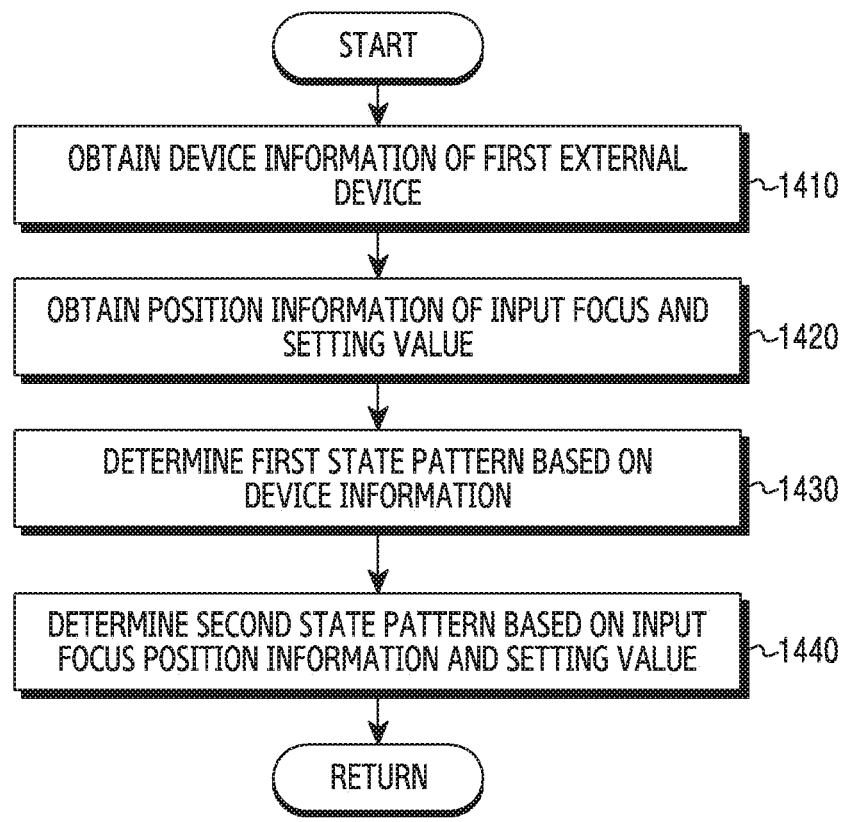
FIG. 14 illustrates a flowchart of detailed operations of determining a display scheme of a virtual input interface in an environment of a plurality of output screens including a plurality of output devices according to an embodiment of the disclosure.

FIG. 14 illustrates a flowchart of detailed operations of determining a display mode of a virtual input interface in an environment of a plurality of output screens including a plurality of output devices according to an embodiment of the disclosure.

Referring to FIG. 14, the operation may be the detailed flowchart of operation 1320 of FIG. 13.

In operation 1410, the processor 450 may obtain the device information of the first external device including the second display. The processor 450 may obtain output performance (e.g., a resolution support range, a screen size, an aspect ratio, a light source, power consumption, etc.) information of the first external device.

In operation 1420, the processor 450 may obtain the position information of the input focus and/or the setting value information of the virtual input interface. For example, the processor 450 may obtain information that touch_keyboard is set to off.

In operation 1430, the processor 450 may determine the first state pattern, based on the device information of the first external device obtained in operation 1410. The processor 450 may determine the first state pattern by further using at least one current context (e.g., a type of application currently running, a resource use amount, a remaining battery level, etc.) of the electronic device 210.

In an embodiment, the state pattern indicates a pattern which alters an object action or an object behavior by changing the state of the object according to a set of rules, and is a kind of a design pattern. Using the state pattern, if a new state is added, modifications in source code may be minimized and maintenance of the code may be simplified.

In an embodiment, the first state pattern may correspond to at least one of the dual view mode (DualView), the dual mode (Dual), or the standalone mode (StandAlone). For example, in response to detecting that the screen size of the first external device exceeds a preset size, the processor 450 may determine the first state pattern corresponding to the dual view mode. For example, in response to detecting that the remaining battery level of the electronic device 210 exceeds a preset value, the processor 450 may determine the first state pattern corresponding to the dual mode.

In operation 1440, the processor 450 may determine the second state pattern based on the position information of the input focus and/or the setting value information of the virtual input interface obtained in operation 1420. That is, the processor 450 according to an embodiment of the disclosure may easily handle a new mode and a new operation scheme to be added, using the double state pattern.

In an embodiment, the values corresponding to the second state pattern may include any one of PhoneState for processing the display state of the virtual input interface of the normal type at the electronic device 210, DesktopState for processing the display state of the virtual input interface of the floating type at the first external device, StandAlonePhoneState for processing the display state of the virtual input interface if the standalone mode is released at the electronic device 210, and StandAloneDesktopState for processing the display state of the virtual input interface if the standalone mode is entered at the electronic device 210.

In an embodiment, at least some of the values corresponding to the second state pattern may correspond to at least some of values corresponding to the first state pattern. In other words, at least some of the values corresponding to the second state pattern may have dependency on at least some of the values corresponding to the first state pattern. For example, one of PhoneState or DesktopState may correspond to one of Dual or DualView. For example, one of StandAlonePhoneState or StandAloneDesktopState may correspond to the standalone mode (StandAlone).

For example, if the first state pattern corresponds to the dual view mode (DualView), the processor 450 may determine the second state pattern to one of PhoneState or DesktopState, based on the setting value information of the virtual input interface. For example, if the setting value information of the virtual input interface is set to on, the processor 450 may determine the second state pattern to PhoneState. If the setting value information of the virtual input interface is set to off, the processor 450 may determine the second state pattern to DesktopState.

Figure 15:
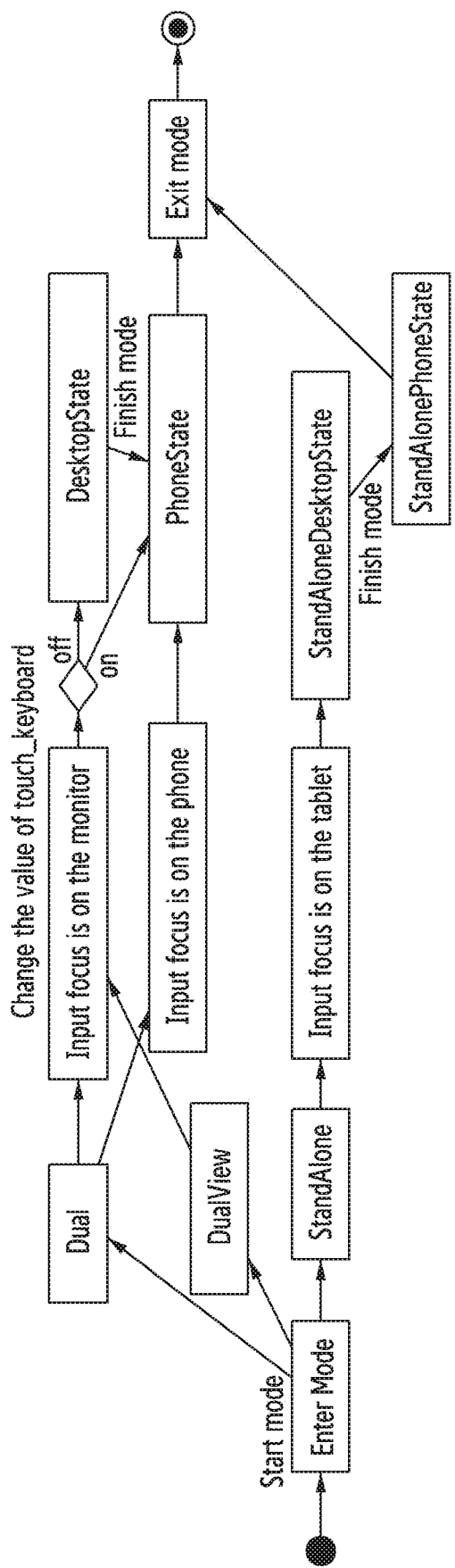
FIG. 15 illustrates a state chart diagram according to an embodiment of the disclosure.

FIG. 15 illustrates a state chart diagram according to an embodiment of the disclosure.

Referring to FIG. 15, the processor 450 according to an embodiment of the disclosure may determine the first state pattern, in response to detecting the external output device 220. For example, in response to detecting the connection of the first external device including the second display, the processor 450 may determine the first state pattern to be the dual mode (Dual) or the dual view mode (DualView).

The processor 450 according to an embodiment of the disclosure may determine the first state pattern, in response to detecting a user input. For example, in response to detecting the user input indicating the standalone mode entry, the processor 450 may determine the first state pattern to be the standalone mode (StandAlone).

The processor 450 according to an embodiment of the disclosure may determine the second state pattern, in response to identifying the current position of the input focus. For example, if the first state pattern is determined to be the dual mode (Dual), the processor 450 may determine the second state pattern to be PhoneState, in response to identifying the input focus placed at the electronic device 210. For example, if the first state pattern is determined to be the dual view mode (DualView), the processor 450 may determine the second state pattern to be PhoneState, in response to identifying the input focus placed at the electronic device 210. For example, if the first state pattern is determined to be the standalone mode (StandAlone), the processor 450 may determine the second state pattern to be StandAloneDesktopState, in response to identifying the input focus placed at the electronic device 210.

In an embodiment, if the first state pattern is determined to be a particular mode, the processor 450 may omit identifying the input focus. For example, if the first state pattern is determined to be the dual view mode, the input focus resides on the external output device 220 and thus the processor 450 may identify the setting value of the virtual input interface, without identifying the position of the input focus.

In an embodiment, the processor 450 may determine the second state pattern, in response to identifying the current position of the input focus or the setting value of the virtual input interface. For example, if the first state pattern is determined to be Dual (corresponding to the dual mode) and the input focus is placed at the external output device 220, the processor 450 may determine the second state pattern to be DesktopState in response to the setting value of the virtual input interface which is set to off and determine to be PhoneState in response to on.

Figure 16:
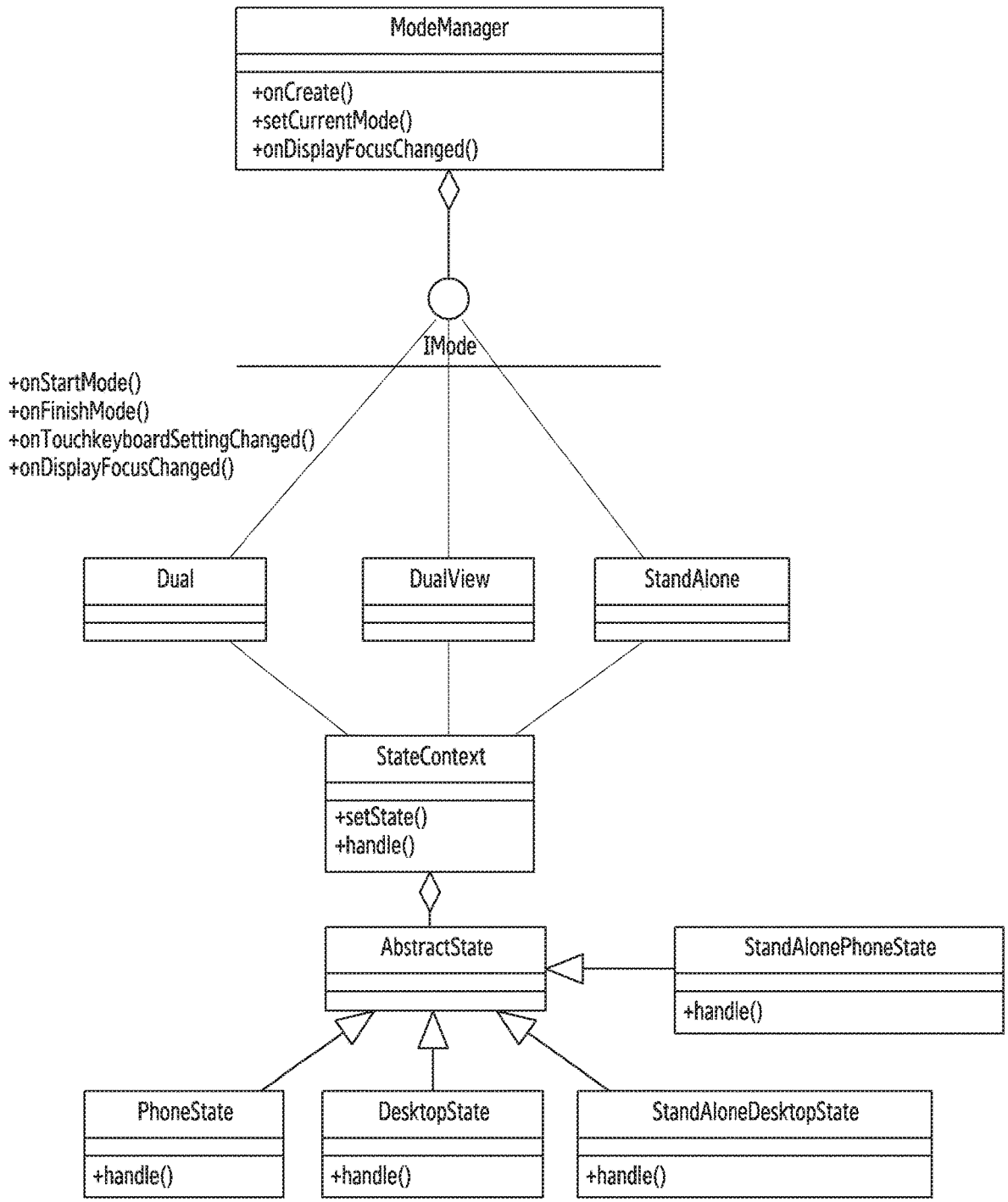
FIG. 16 illustrates a class diagram according to an embodiment of the disclosure.

FIG. 16 illustrates a class diagram according to an embodiment of the disclosure.

Referring to FIG. 16, a ModeManager class may be defined to manage the display of the virtual input interface in the environment of the plurality of the output screens. The ModeManager class may define a setCurrentMode( ) method for setting the display mode of the virtual input interface.

In an embodiment, a mode class may be defined to distinguish and manage the display modes of the virtual input interface and id defined by the interface mode, which defines the methods and properties that each mode class is required to implement. The interface may define an onStartMode( ) method requiring the display of the virtual input interface if the environment of the plurality of the output screens commences, an onFinishMode( ) method for requiring no more display of the virtual input interface if the environment of the plurality of the output screens ends, an onTouchKeyboardSettingChanged( ) method for the change of the setting value of the virtual input interface, and so on. In addition, a Dual mode class, a DualView mode class, and a StandAlone mode class may be example classes that implement the mode interface.

In an embodiment, the Dual mode class, the DualView mode class, and the StandAlone mode class may be associated with a StateContext class, and the StateContext class may be concrete implementations of an AbstractState class. The AbstractState class may be inherited by a PhoneState class, a DesktopState class, a StandAlonePhone class, and a StandAloneDesktop class.

Figure 17A:
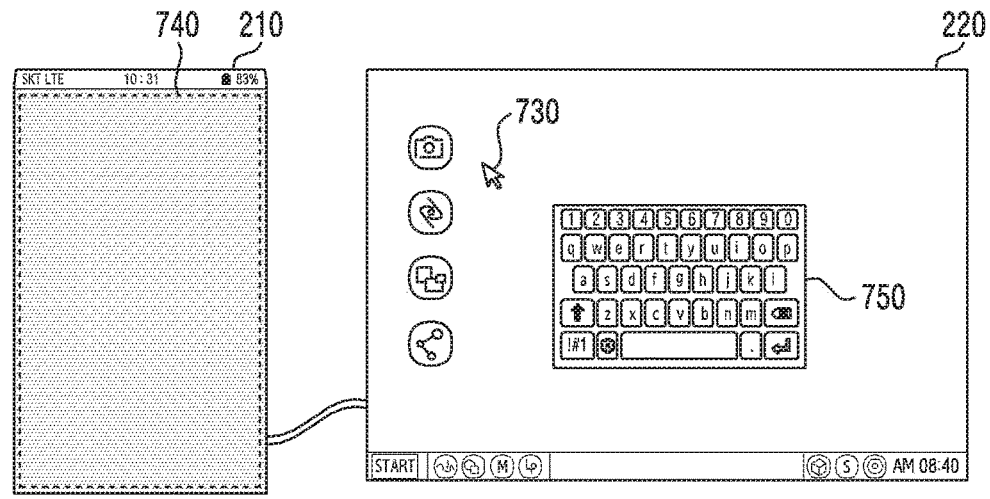
FIG. 17A illustrates an example of changing display of a virtual input interface according to a movement of an input focus according to an embodiment of the disclosure.
Figure 17B:
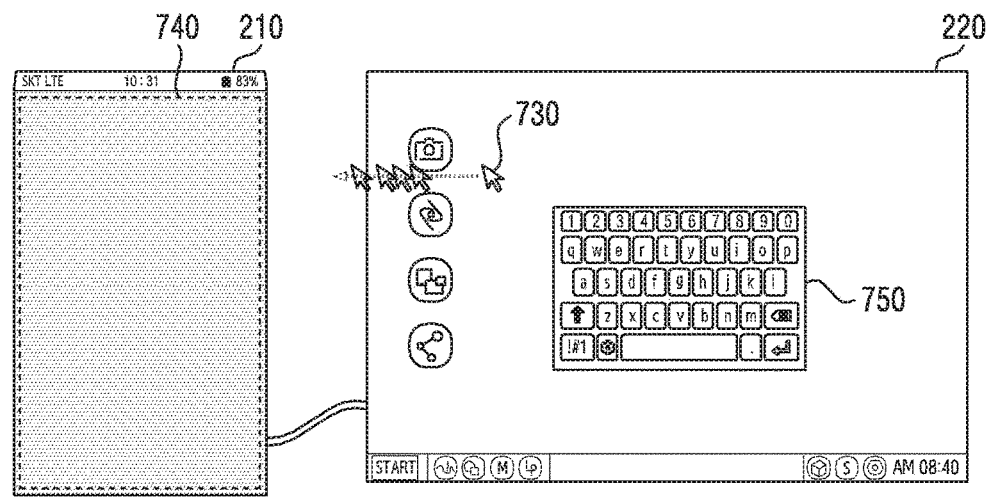
FIG. 17B illustrates the example of changing the display of the virtual input interface according to the movement of the input focus according to an embodiment of the disclosure.
Figure 17C:
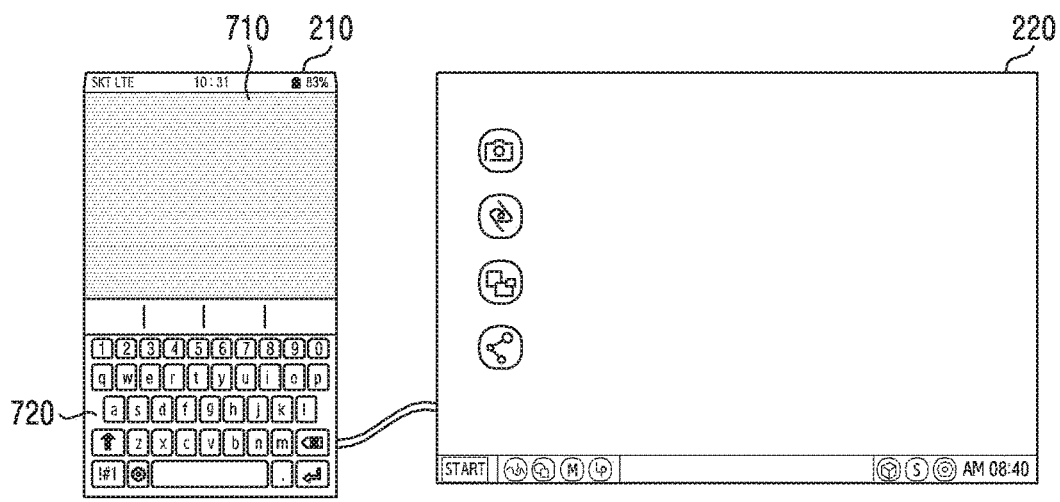
FIG. 17C illustrates the example of changing the display of the virtual input interface according to the movement of the input focus according to an embodiment of the disclosure.

FIGS. 17A, 17B, and 17C illustrate an example of changing display of a virtual input interface according to a movement of an input focus according to various embodiments of the disclosure.

Referring to FIG. 17A, the entire area of the display 410 may display the touch pad area 740, and part of the external output device 220 may display a virtual keyboard 750 of the floating type. That is, the first state pattern may correspond to the dual view mode (i.e., DualView), and the second state pattern may correspond to DesktopState.

Referring to FIG. 17B, the processor 450 may detect a user input which moves the position of the input focus 730 (e.g., a mouse cursor) from the external output device 220 to the electronic device 210. For example, the processor 450 may detect the user input for moving the position of the input focus 730 to the electronic device 210, based on a movement direction and a movement speed of the input focus 730.

Referring to FIG. 17C, the processor 450 may change the display of the virtual input interface, by changing the second state pattern. The processor 450 may alter the display of the virtual input interface, by changing the second state pattern from DesktopState to PhoneState. For example, the processor 450 may display the virtual keyboard 720 of the normal type on at least part of the display 410, and control the external output device 220 not to display the virtual keyboard any more.

Figure 18:
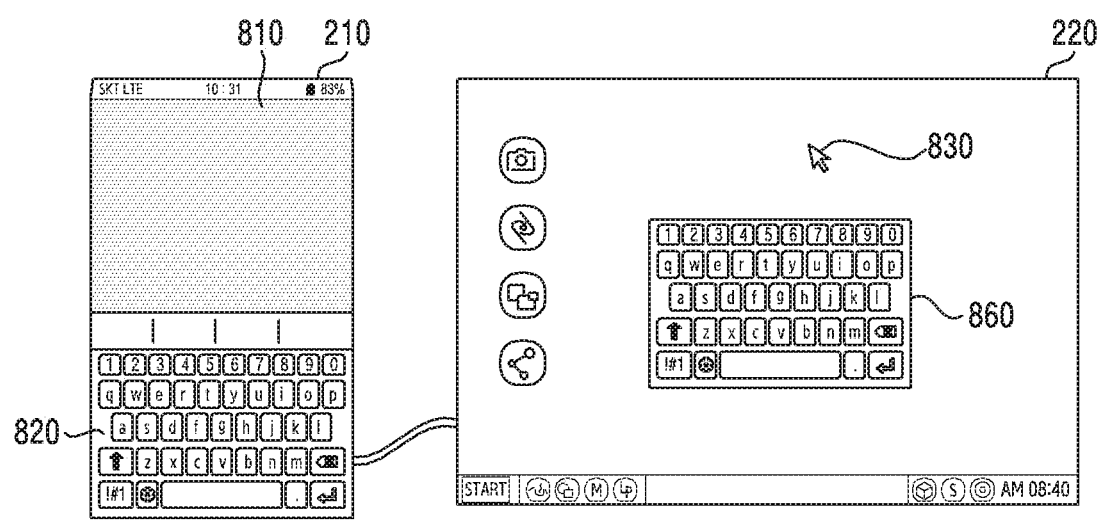
FIG. 18 illustrates an output device for displaying a virtual input interface on a plurality of output screens according to an embodiment of the disclosure.

FIG. 18 illustrates an output device for displaying a virtual input interface on a plurality of output screens according to an embodiment of the disclosure.

According to the embodiments as mentioned above, the virtual input interface may be displayed at one of the display 410 or the external output device 220 based on its setting value or the input focus position.

To implement the display scheme which displays the virtual input interface at both of the display 410 and the external output device 220, a new state pattern corresponding to the second state pattern may be defined. For example, the processor 450 may define a new state pattern of BothDesktopAndPhone.

In an embodiment, if the second state pattern is changed to BothDesktopAndPhone, the processor 450 may display the virtual input interface at both of the display 410 and the external output device 220. For example, the processor 450 may display the virtual keyboard 820 of the normal type on at least part of the display 410, and may display the virtual keyboard 860 of the floating type in at least some area of the external output device 220.

Figure 19A:
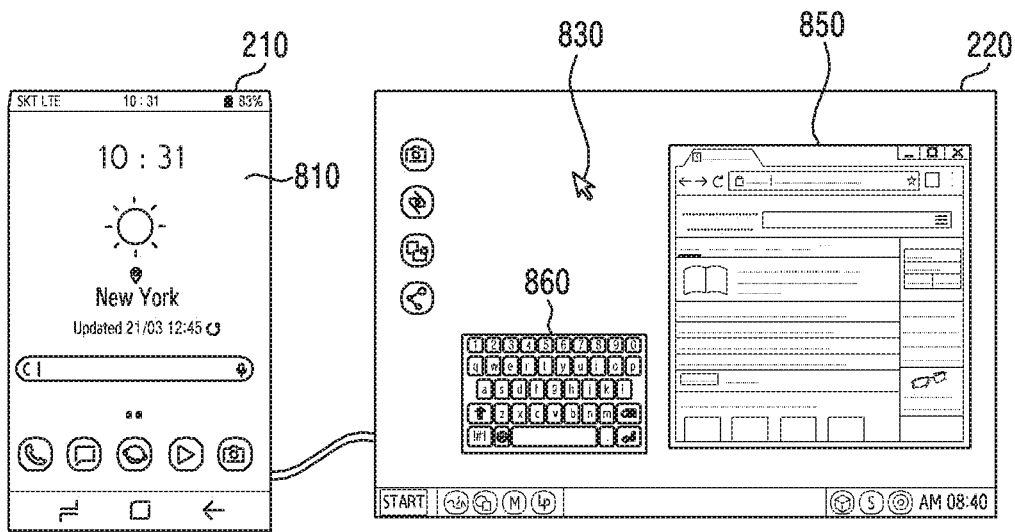
FIG. 19A illustrates an output screen not displaying a virtual input interface if an external input device is connected according to an embodiment of the disclosure.
Figure 19B:
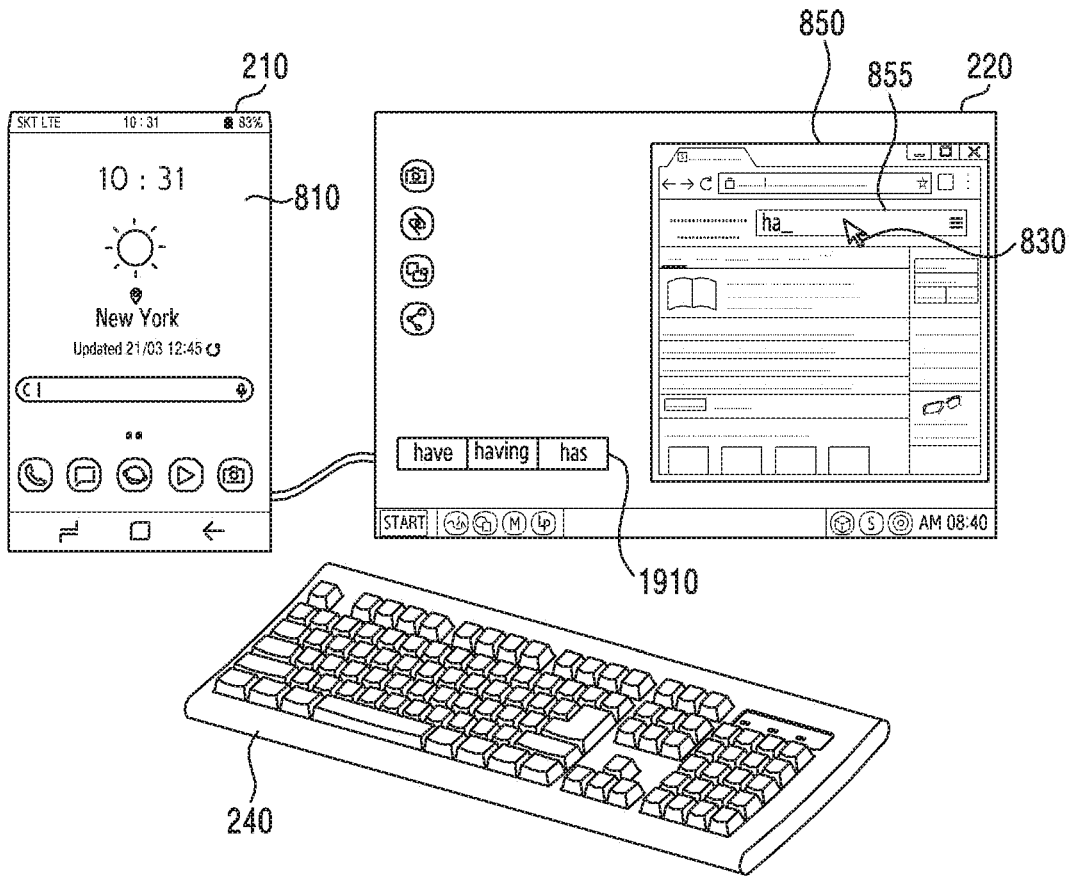
FIG. 19B illustrates the output screen not displaying the input interface if the external input device is connected according to an embodiment of the disclosure.

FIGS. 19A and 19B illustrate an output screen not displaying a virtual input interface if an external input device is connected according to various embodiments of the disclosure.

Referring to FIG. 19A, the electronic device 210 may be connected with the external output device 220, and may not be connected with a physical input interface (e.g., the keyboard 240). The processor 450 may determine the first state pattern to be the dual mode (Dual) and determine the second state pattern to be DesktopState. That is, the processor 450 may display at least one application execution screen 810 corresponding to the mobile environment on the display 410, display at least one application execution screen 850 corresponding to the desktop environment on the external output device 220, and display the virtual keyboard 860 of the floating type on at least some area of the external output device 220.

Referring to FIG. 19B, the electronic device 210 may be connected with the physical input interface (e.g., the keyboard 240). In response to the connection of the physical input interface, the processor 450 may change the display of the virtual input interface. For example, the processor 450 may control the external output device 220 not to further display the virtual input interface which is displayed at the external output device 220, but to display a candidate word display area 1910 in at least some area of the external output device 220. The candidate word display area 1910 may enable the user to input words more easily (e.g., autocomplete) in the search window 855. For example, if the user inputs "ha" using the keyboard 240, the processor 450 may display candidate words of "ha," e.g., 'have', 'having', 'has', etc., in the candidate word display area 1910.

In an embodiment, to implement the display scheme which displays the virtual input interface at none of the display 410 and the external output device 220, a new state pattern corresponding to the second state pattern may be defined. For example, the processor 450 may define a new state pattern of NoneDesktopAndPhone. If the second state pattern is changed to NoneDesktopAndPhone, the processor 450 may display the device (e.g., the external output device 220) which is displaying the virtual input interface before the second state pattern is changed, to display the candidate word display area 1910.

According to various embodiments of the disclosure, an operating method of an electronic device which is connected to a first external device including a second display, and includes a first display, may include determining a display scheme of a virtual input interface as a first display scheme, based on context information of the electronic device, in response to a change of context of the electronic device detected while the virtual input interface is displayed based on the first display scheme, changing the display scheme of the virtual input interface from the first display scheme to a second display scheme which is different from the first display scheme, and displaying the virtual input interface based on the second display scheme.

In various embodiments, the virtual input interface may be a virtual soft keyboard.

In various embodiments, the change of the context of the electronic device may be at least one of disconnection from the first external device, connection of a second external device, a change of a setting value, a change of a display mode, or a movement of an input focus.

In various embodiments, the display scheme of the virtual input interface may define at least one of a device for displaying the virtual input interface, the number of devices for displaying the virtual input interface, a display type of the virtual input interface, and a display position of the virtual input interface.

In various embodiments, the display scheme of the virtual input interface may be determined based on a first state pattern associated with a display mode and a second state pattern associated with an operating scheme.

In various embodiments, the type of the virtual input interface may be any one of a normal type, a floating type, and a split type.

In various embodiments, the display mode may include a dual view mode, and the dual view mode may be a mode which, according to a setting value, displays the virtual input interface of a first display type on the first display and displays no virtual input interface on the second display, or displays the virtual input interface of a second display type on the second display and displays no virtual input interface on the first display.

In various embodiments, the display mode may include a dual mode, and the dual mode may be a mode which, according to a setting value, displays the virtual input interface of a first display type on the first display and displays no virtual input interface on the second display, or displays the virtual input interface of a designated display type on a display on which an input focus of a user is placed and displays no virtual input interface on the remaining display.

In various embodiments, the display mode may include a standalone mode, and the standalone may include a mode which displays at least one application execution screen corresponding to a desktop environment or the virtual input interface of a floating type on the first display.

In various embodiments, changing the display scheme of the virtual input interface to the second display scheme while displaying the virtual input interface based on the first display mode may be performed based on execution of an application installed on the electronic device, and the application may be installed on the electronic device based on an install file version.

The computer readable recording medium may include a hard disk, a floppy disc, a magnetic medium (e.g., a magnetic tape), an optical storage medium (e.g., a CD-ROM or a digital versatile disc (DVD)), a magnetic-optic medium (e.g., a floptical disc), and an internal memory. The instruction may include code created by a compiler or code executable by an interpreter. The module or program module according to various embodiments may further include at least one or more components among the aforementioned components, or may omit some of them, or may further include additional other components. Operations performed by modules, program modules, or other components according to the various embodiments of the disclosure may be executed in a sequential, parallel, repetitive, or heuristic manner. Some of the operations may be executed in a different order or may be omitted, or other operations may be added.

If the virtual input interface is displayed in the environment of the plurality of the output screens and an event for changing the output of the displayed virtual input interface is detected, one application package (APK) may handle the changed output of the virtual input interface.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first display;
a communication interface; and
at least one processor electrically coupled with the first display and the communication interface,
wherein the at least one processor is configured to:
while a first external device comprising a second display is connected with the electronic device through the communication interface, determine a display scheme of a virtual input interface displayed on the first display as a first display scheme, based on context information of the electronic device,
in response to detecting a change of context of the electronic device while the virtual input interface is displayed on the first display based on the first display scheme, change the display scheme of the virtual input interface from the first display scheme to a second display scheme which is different from the first display scheme, and
control at least one of the first display and the first external device to display the virtual input interface on at least one of the first display and the second display based on the second display scheme.

2. The electronic device of claim 1, wherein the virtual input interface comprises a virtual soft keyboard.

3. The electronic device of claim 2, wherein the change of the context of the electronic device comprises at least one of a disconnection from the first external device, a connection of a second external device, a change of a setting value, a movement of an input focus, or a change of version information of a current platform.

4. The electronic device of claim 3, wherein the display scheme of the virtual input interface is configured to determine at least one of a device for displaying the virtual input interface, a number of devices for displaying the virtual input interface, a display type of the virtual input interface, or a display position of the virtual input interface.

5. The electronic device of claim 4, wherein the display scheme of the virtual input interface is determined based on a first state pattern associated with a display mode and a second state pattern associated with an operating scheme.

6. The electronic device of claim 5, wherein the display type of the virtual input interface comprises one of a normal type, a floating type, or a split type.

7. The electronic device of claim 5,
wherein the display mode comprises a dual view mode, and
wherein the dual view mode comprises a mode which, according to a setting value, displays:
the virtual input interface of a first display type on the first display and displays no virtual input interface on the second display, or
the virtual input interface of a second display type on the second display and displays no virtual input interface on the first display.

8. The electronic device of claim 5,
wherein the display mode comprises a dual mode, and
wherein the dual mode comprises a mode which, according to a setting value, displays:
the virtual input interface of a first display type on the first display and displays no virtual input interface on the second display, or
the virtual input interface of a designated display type on a display on which an input focus is located and displays no virtual input interface on a remaining display.

9. The electronic device of claim 5,
wherein the display mode comprises a standalone mode, and
wherein the standalone mode comprises a mode which displays at least one application execution screen corresponding to a desktop environment or a virtual input interface of a floating type on the first display.

10. The electronic device of claim 1,
wherein the at least one processor is further configured to, using an application installed on the electronic device, change the display scheme of the virtual input interface from the first display scheme to the second display scheme which is different from the first display scheme, and
wherein the application is installed on the electronic device based on an install file version.

11. An operating method of an electronic device comprising a first display, and which is connected to a first external device comprising a second display, the method comprising:
determining a display scheme of a virtual input interface displayed on the first display as a first display scheme, based on context information of the electronic device;
in response to detecting a change of context of the electronic device while the virtual input interface is displayed on the first display based on the first display scheme, changing the display scheme of the virtual input interface from the first display scheme to a second display scheme which is different from the first display scheme; and
displaying the virtual input interface on at least one of the first display and the second display based on the second display scheme.

12. The method of claim 11, wherein the virtual input interface comprises a virtual soft keyboard.

13. The method of claim 12, wherein the change of the context of the electronic device comprises at least one of a disconnection from the first external device, a connection of a second external device, a change of a setting value, a change of a display mode, or a movement of an input focus.

14. The method of claim 13, wherein the display scheme of the virtual input interface is configured to determine at least one of a device for displaying the virtual input interface, a number of devices for displaying the virtual input interface, a display type of the virtual input interface, or a display position of the virtual input interface.

15. The method of claim 14,
wherein the display scheme of the virtual input interface is determined based on a first state pattern associated with the display mode and a second state pattern associated with an operating scheme, and
wherein the display type of the virtual input interface comprises one of a normal type, a floating type, or a split type.

16. The method of claim 15,
wherein the display mode comprises a dual view mode, and
wherein the dual view mode comprises a mode which, according to a setting value, displays:
the virtual input interface of a first display type on the first display and displays no virtual input interface on the second display, or
the virtual input interface of a second display type on the second display and displays no virtual input interface on the first display.

17. The method of claim 15,
wherein the display mode comprises a dual mode, and
wherein the dual mode comprises a mode which, according to a setting value, displays:
the virtual input interface of a first display type on the first display and displays no virtual input interface on the second display, or
the virtual input interface of a designated display type on a display on which an input focus is located and displays no virtual input interface on a remaining display.

18. The method of claim 15,
wherein the display mode comprises a standalone mode, and
wherein the standalone mode comprises a mode which displays at least one application execution screen corresponding to a desktop environment or the virtual input interface of a floating type on the first display.

19. The method of claim 11,
wherein changing the display scheme of the virtual input interface to the second display scheme while displaying the virtual input interface based on a first display mode is performed based on an execution of an application installed on the electronic device, and
wherein the application is installed on the electronic device based on an install file version.

20. A non-transitory computer-readable storage medium encoded with instructions which, when executed by at least one processor of the electronic device, cause the electronic device to execute the method of claim 11.

* * * * *